US008041776B2

(12) United States Patent
Friedman et al.

(10) Patent No.: US 8,041,776 B2
(45) Date of Patent: *Oct. 18, 2011

(54) ASYNCHRONOUS REAL-TIME RETRIEVAL OF DATA

(75) Inventors: Gregory S. Friedman, Redmond, WA (US); Coyle Brett Marl, Seattle, WA (US)

(73) Assignee: Visto Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/708,277

(22) Filed: Feb. 18, 2010

(65) Prior Publication Data

US 2010/0146072 A1  Jun. 10, 2010

Related U.S. Application Data

(63) Continuation of application No. 12/017,536, filed on Jan. 22, 2008, now abandoned, which is a continuation of application No. 10/770,841, filed on Feb. 2, 2004, now Pat. No. 7,363,349.

(60) Provisional application No. 60/444,213, filed on Jan. 31, 2003.

(51) Int. Cl.
G06F 15/16 (2006.01)
(52) U.S. Cl. .......................... 709/217; 709/227; 709/201
(58) Field of Classification Search .................. 709/217, 709/227, 201
See application file for complete search history.

(56) References Cited

U.S. PATENT DOCUMENTS

| 5,826,014 A | 10/1998 | Coley et al. |
| 5,826,024 A | 10/1998 | Higashimura et al. |
| 5,850,517 A | 12/1998 | Verkler et al. |
| 5,857,201 A | 1/1999 | Wright, Jr. et al. |
| 5,895,471 A | 4/1999 | King et al. |
| 5,987,463 A | 11/1999 | Draaijer et al. |
| 6,134,432 A | 10/2000 | Holmes et al. |
| 6,185,598 B1 | 2/2001 | Farber et al. |

(Continued)

FOREIGN PATENT DOCUMENTS

WO WO 02/06964 1/2002

OTHER PUBLICATIONS

"Java Message Service", Sun Microsystems Corp., Mountain View, CA, Nov. 9, 1999.

(Continued)

Primary Examiner — Kristie Shingles
(74) Attorney, Agent, or Firm — Oblon, Spivak, McClelland, Maier & Neustadt, L.L.P.

(57) ABSTRACT

A data retrieval system includes a gateway server and an access client. The gateway server is communicatively connected to the access client through a network. The gateway server provides a presentation service (PS) and a real-time service (RTS), which cooperate with the access client to retrieve data from a data store and then provide the retrieved data to a user's remote communication device. More particularly, when a user wishes to retrieve data from the data store or to send data to the data store, the user establishes a communication connection between his or her remote communication device and the gateway server, and then requests the desired data from the gateway server. In response, the gateway server sends a command to the access client, instructing it to retrieve the requested data. The access client retrieves the requested data from the data store, and returns the retrieved data to the gateway server. The gateway server then relays the requested information back to the user's remote communication device.

40 Claims, 11 Drawing Sheets

U.S. PATENT DOCUMENTS

| | | |
|---|---|---|
| 6,196,846 B1 | 3/2001 | Berger et al. |
| 6,226,649 B1 | 5/2001 | Bodamer et al. |
| 6,397,246 B1 | 5/2002 | Wolfe |
| 6,463,463 B1 | 10/2002 | Godfrey et al. |
| 6,563,800 B1 | 5/2003 | Salo et al. |
| 6,782,419 B2 | 8/2004 | Tobita et al. |
| 6,947,943 B2 | 9/2005 | DeAnna et al. |
| 6,954,714 B2 | 10/2005 | Suzuki et al. |
| 6,959,436 B2 | 10/2005 | Peng |
| 6,981,029 B1 | 12/2005 | Menditto et al. |
| 6,983,312 B1 | 1/2006 | O'Neil |
| 6,993,137 B2 | 1/2006 | Fransdonk |
| 7,010,581 B2 | 3/2006 | Brown et al. |
| 7,028,049 B1 | 4/2006 | Shelton |
| 7,035,828 B2 | 4/2006 | Ketonen et al. |
| 7,085,834 B2 | 8/2006 | Delany et al. |
| 2002/0078198 A1 | 6/2002 | Buchbinder et al. |
| 2002/0095487 A1 | 7/2002 | Day et al. |
| 2002/0103934 A1 | 8/2002 | Fishman et al. |
| 2002/0116472 A1 | 8/2002 | Kalish et al. |
| 2003/0054810 A1 | 3/2003 | Chen et al. |
| 2003/0069921 A1 | 4/2003 | Lamming et al. |
| 2003/0115200 A1 | 6/2003 | Anthony et al. |
| 2003/0177171 A1 | 9/2003 | Brown et al. |
| 2004/0082315 A1 | 4/2004 | Aoki |

OTHER PUBLICATIONS

Steffen Lipperts, Anthony Sang-Bum Park, An Agent-Based Middleware—A Solution for Terminal and User Mobility, 1999, Computer Networks.

John Lamb, Peter Lew, Lotus Notes and Domino 5—Scalable Network Design—Web Server Network Infrastructure, 1999, McGraw-Hill.

A. Frier, P. Karlton, and P. Kocher, The SSL 3.0 Protocol, Nov. 18, 1996, Netscape Communicatios Corp.

Mark R. Brown, Using Netscape™ 2, Special Edition, The Most Complete Reference (Chapter 33); 1995; 25 Pgs. (RIMV00055304-RIMV00055328).

Microsoft Exchange 2000 Server, Customizing Microsoft® Outlook® Web Access White Paper; Published Nov. 2001; 106 Pgs. (RIMV00055329-RIMV00055434).

Microsoft Exchange 2000 Server, Microsoft® Outlook Web Access in Microsoft Exchange 2000 Server; Published Mar. 2000 (Updated May 2002; 18 Pgs. (RIMV00055435-RIMV00055452).

KC Lemsen, et al.; Using Microsoft® Exchange 2000, Front End Servers; Published Jun. 2000 (Updated Oct. 2002; 95 Pgs. (RIMV00055453-RINIV00055541).

International Search Report Application No. 10169425.5-2413 Mailed Apr. 6, 2011.

Klensin, J., et al., Simple Mail Transfer Protocol, Apr. 2001, AT&T Laboratories, pp. 1-79.

Crispin, M., Internet Message Access Protcol—Version 4, Sep. 2002, University of Washington, pp. 1-97.

Meyers, J., Post Office Protocol—Version 3, May 1996, Dover Beach Consulting, Inc., pp. 1-23.

U.S. Appl. No. 95/001,138, filed Jan. 21, 2009, Friedman, et al.

Vipin Samar, "Single Sign-On Using Cookies for Web Applications", IEEE, 1999, pp. 158-163.

George Apostolopoulos, et al., "Design, Implementation and Performance of a Content-Based Switch", IEEE INFOCOM 2000, pp. 1117-1126.

U.S. Appl. No. 12/708,277, filed Feb. 18, 2010, Friedman, et al.

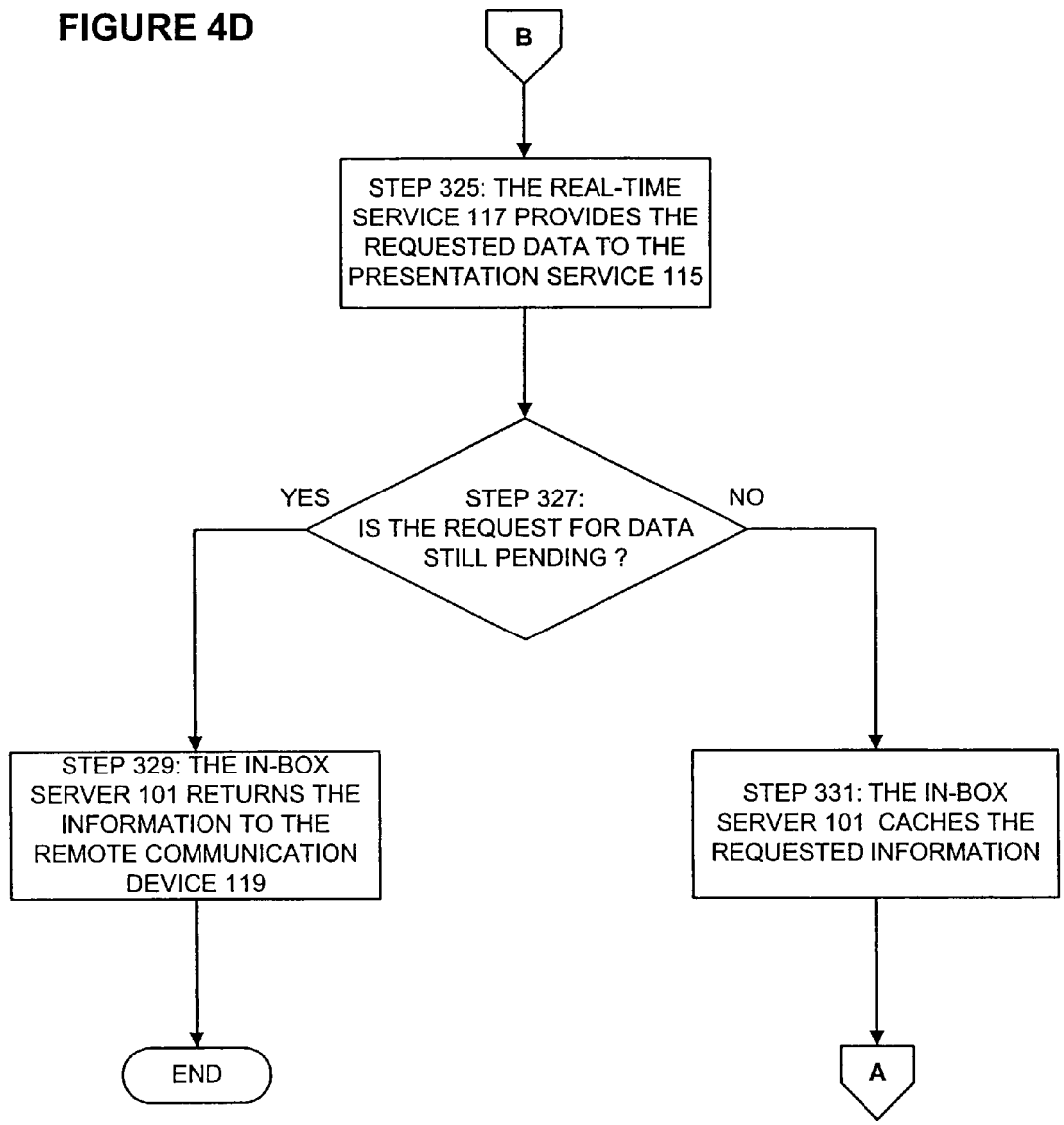

ASYNCHRONOUS REAL-TIME RETRIEVAL OF DATA

CROSS-REFERENCE TO RELATED APPLICATIONS

This application is a Continuation of U.S. application Ser. No. 12/017,536, filed Jan. 22, 2008, which is a Continuation of U.S. application Ser. No. 10/770,841, filed Feb. 2, 2004, and in turn claims priority to U.S. application Ser. No. 60/444,213, filed Jan. 31, 2003, entitled "Asynchronous Real-Time Retrieval Of Data," the entire contents of each of which are hereby incorporated herein by reference.

BACKGROUND OF THE INVENTION

1. Field of the Invention

The present invention relates to the asynchronous real-time retrieval of data. Various aspects of the present invention are particularly applicable to the asynchronous real-time retrieval of data from a corporate database to a remote device, such as a wireless telephone or personal digital assistant.

2. Description of the Related Art

Recently, digital information has become more and more important to people of all walks of life. As the importance of digital information has increased, the need for convenient remote access to a variety of types of digital information has increased as well. For example, traveling businessmen may desire continual access to information contained in electronic spreadsheets, attorneys may desire access to word processing documents from a client's location, and students may want to send or retrieve electronic mail while in school.

In order to address this need, many communication service providers allow their customers to access remote digital information through a communication network. For example, a wireless telephone service provider may allow its customers to use their wireless telephones or other communication devices to send and receive retrieve electronic mail, retrieve image information from a network, obtain contact information from a centralized database, or the like. Similarly, some companies have established remote high-speed Internet connections, both wired and wireless, at public locations such as restaurants, hotels, and airports, which can be accessed by a customer's computer.

While communication service providers have created an infrastructure that potentially allows their customers remote access to digital information, many practical issues still prevent this infrastructure from being fully utilized. For example, some customers seek to access digital information stored behind a barrier, such as digital information stored in their employer's database and protected by a firewall. With this arrangement, if the employer's network did not support an access tool allowing external connections through the firewall then a customer would be prevented from accessing the desired digital information through the communication service provider's network. These access tools include, for example, the use of a virtual private network (VPN) or similar techniques for enabling secure and authenticated connections from devices not directly connected to the employer's network. Moreover, even if the employer's network supported such a tool, the customer's communication device could still not access the data if the user's device itself was not configured to support that tool.

In other situations, a customer may attempt to use an unsuitable communication device to retrieve data. For example, a user may attempt to employ a personal digital assistant or wireless telephone with a relatively simple browser to retrieve a Web page with a large amount of image or audio data. Before the large amount of data can be fully retrieved, the personal digital assistant or wireless telephone may "time out" and sever the connection. Alternately or additionally, the user may seek to download more data than the personal digital assistant or wireless telephone may store.

SUMMARY OF THE INVENTION

Advantageously, various examples of the invention allow a user to more conveniently send data to and retrieve data from a remote data store using a remote communication device. With different aspects of the invention, a data retrieval system includes an in-box (IB) server, referred to hereafter more generally as a "gateway server," and a desktop access client (DAC), referred to hereafter more generally simply as an access client. The gateway server is communicatively connected to the access client through a network. The gateway server provides a presentation service (PS) and a real-time service (RTS), which cooperate with the access client to retrieve data from a data store and then provide the retrieved data to a user's remote communication device using a presentation protocol appropriate to the device's capabilities.

With various implementations of the invention, the access client will create a connection to the gateway server. When the user wishes to retrieve data from the data store or to send data to the data store, the user establishes a communication connection between his or her remote communication device and the gateway server, and then requests the desired data from the gateway server. In response, the gateway server sends a command to the access client, instructing it to retrieve the requested data. The access client retrieves the requested data from the data store, and returns the retrieved data to the gateway server. The gateway server then relays the requested information back to the user's remote communication device through the presentation server using a presentation protocol appropriate to the device's capabilities.

BRIEF DESCRIPTION OF THE DRAWINGS

FIGS. 4A-4E illustrate a flowchart showing a method of retrieving data from a data store according to various embodiments of the invention.

DETAILED DESCRIPTION OF THE PREFERRED EMBODIMENTS

Figure 1:
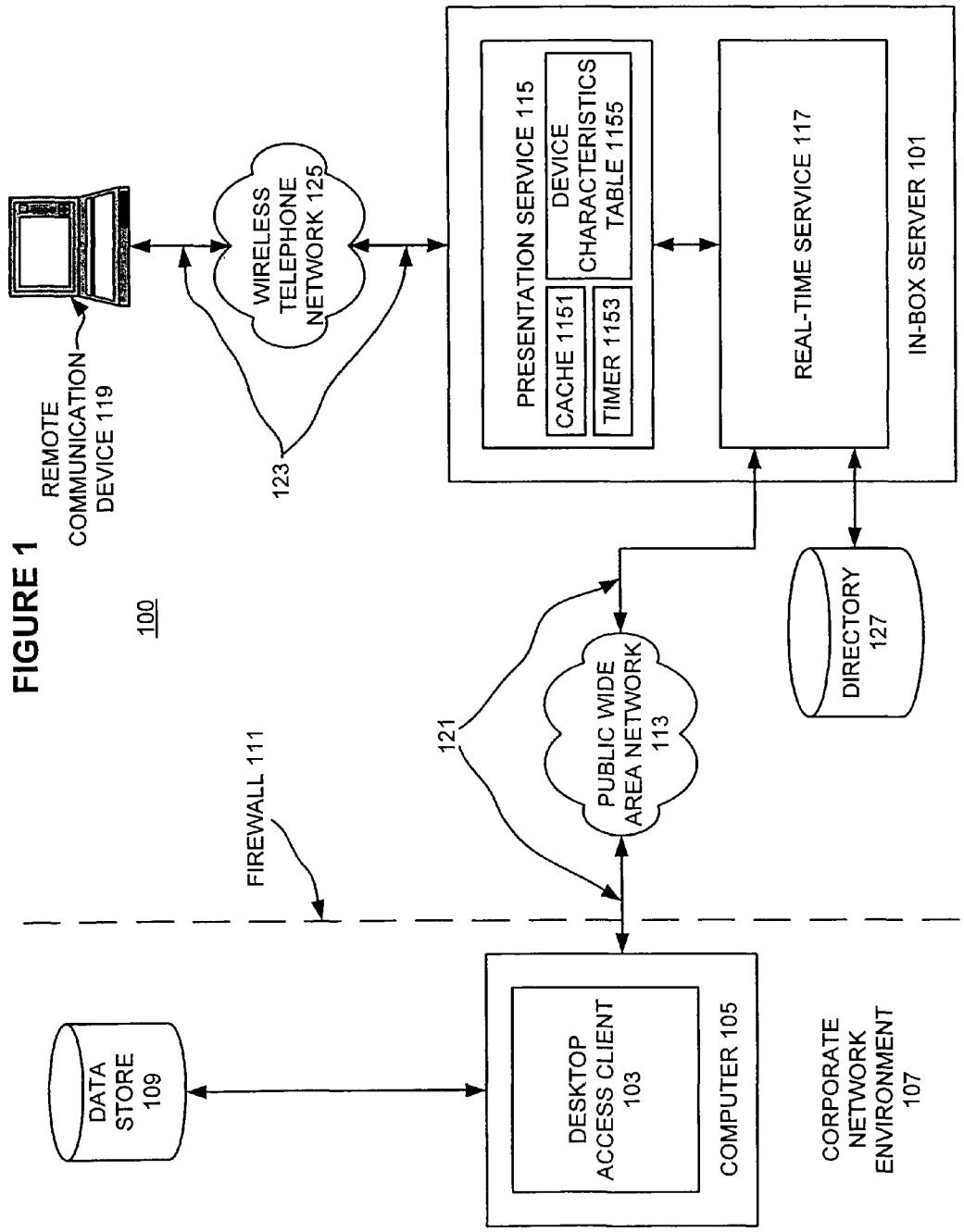
FIG. 1 illustrates a network environment including a system for asynchronous retrieval of data according to various embodiments of the invention.

FIG. 1 shows a schematic block diagram of a data retrieval system 100 according to various embodiments of the invention. The retrieval system 100 allows for the retrieval of data, such as data from a corporate data store, to a remote device. As seen in this figure, the data retrieval system 100 includes at least one gateway (IB) server 101 and an access client (DAC) 103. In the illustrated example, the access client 103 is hosted by a user's computer 105. The computer 105 is located in, for example, a corporate network environment 107 that includes the data store 109 from which data is to be retrieved. The data store 109 may be any type of data store, such as a database that organizes data, a server device that provides services to one or more client devices or a combination of the two. The data store 109 may be, for example, a Lotus Domino server or a Microsoft Exchange server that manages a variety of data including electronic mail messages, calendar information, contact information and the like. The corporate network environment 107 may also include a firewall 111 or other barrier for preventing unwanted access to the corporate network environment 107. The data store 109 may also be a publicly available data store, such as, for example, a Yahoo email server or the like. Still further, the data store may be a generic IMAP or POP3 mail store, or even a store employing a desired file system, such as the NTFS file system.

As shown in this figure, the gateway server 101 is communicatively connected to the access client 103 through a network 113, such as a wide-area network. The network 113 may be a publicly accessible network, such as the Internet. Alternately, the network may be a private network (often referred to as an intranet), or a combination of public and private networks. The gateway server 101 provides a presentation service (PS) 115 and a real-time service (RTS) 117, each of which will be explained in detail below. The presentation service 115 and the real-time service 117 of the gateway server 101 cooperate with the access client 103 to retrieve data from the data store 109 and then provide the retrieved data to the user's remote communication device 119.

More particularly, the access client 103 creates a connection 121 (which may be, for example, a persistent connection) to the gateway server 101 through the firewall 111. The access client 103 then lies dormant until it receives commands from the gateway server 101 to retrieve data from the gateway server 101 or to provide data to the gateway server 101. When the user wishes to retrieve data from the data store 109 to the user's remote communication device 119 (or, alternatively, to send data from the user's remote communication device 119 to the data store 109), the user establishes a communication connection 123 between the remote communication device 119 with the gateway server 101. Through the user's remote communication device 119, the user then requests the desired data from the gateway server 101. In response, the gateway server 101 sends a command over the connection 121 to the access client 103, instructing the access client 103 to retrieve the requested data. In response, the access client 103 retrieves the requested data from the data store 109, and returns the retrieved data to the gateway server 101. The gateway server 101 then relays the requested information back to the user's remote communication device 119. This process, together with the components of the system 100, will be discussed in more detail below.

Operating Environment

Figure 2:
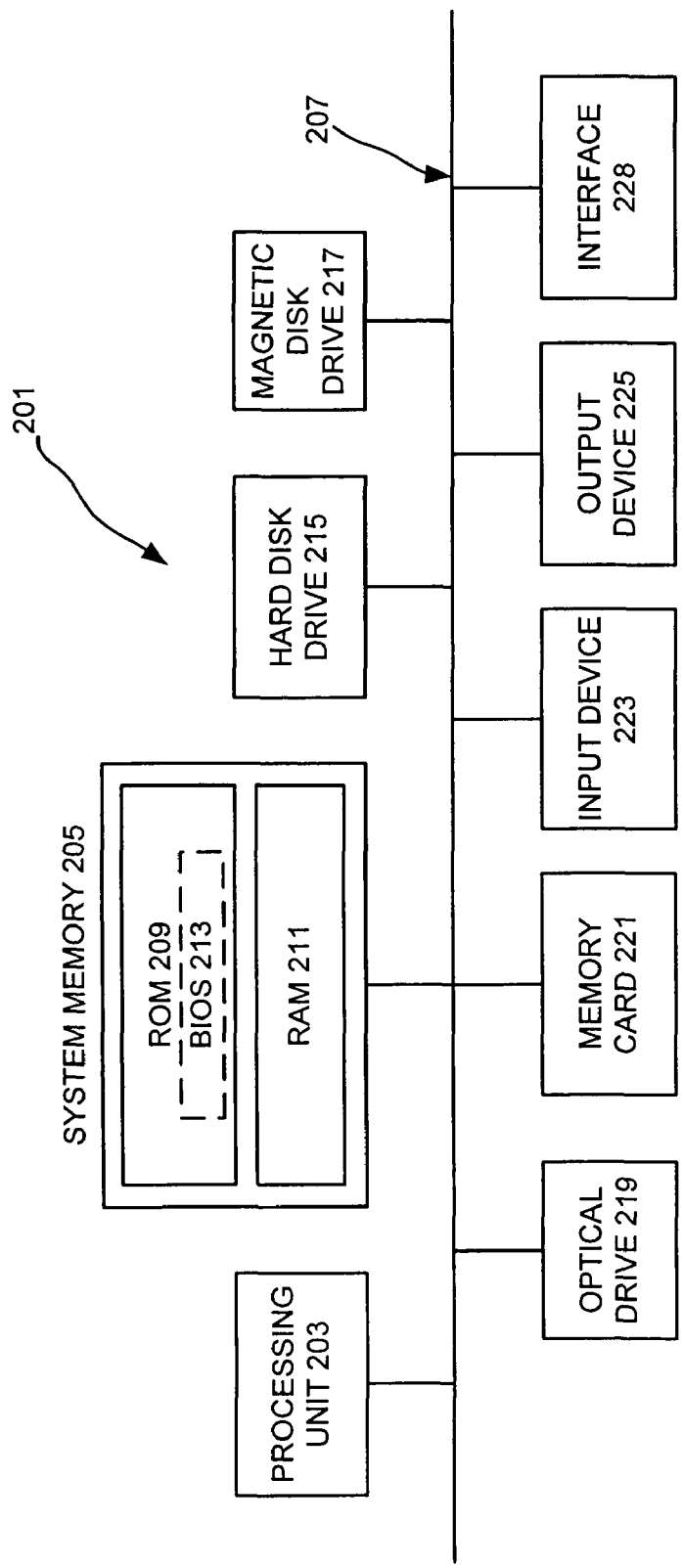
FIG. 2 illustrates an example of a computing system that may be used to implement various embodiments of the invention.

As will be appreciated by those of ordinary skill in the art, the gateway server 101 may be implemented using one or more computing devices, such as a programmable computer that may be programmed to send, retrieve and store the data files that make up electronic messages. This type of computer can be embodied by, for example, an electronic mail account server. FIG. 2 shows one example of such a programmable computer system 201 capable of retrieving and caching electronic mail data files from one or more outside electronic mail accounts. The computer system 201 includes a processing unit 203, a system memory 205, and a system bus 207 that couples various system components, including the system memory 105, to the processing unit 203. The system memory 205 may include a read-only memory (ROM) 209 and a random access memory (RAM) 211.

A basic input/output system 213 (BIOS), containing the routines that help to transfer information between elements within the computer system 201, such as during startup, may be stored in the read-only memory (ROM) 209. If the computer system 201 is embodied by a personal computer, it may further include a hard disk drive 215 for reading from and writing to a hard disk (not shown), a magnetic disk drive 217 for reading from or writing to a removable magnetic disk (not shown), an optical disk drive 219 for reading from or writing to a removable optical disk (not shown) such as a CD-ROM or other optical media, or a memory card 221, such as a flash memory card.

A number of program modules may be stored on the ROM 209, the hard disk drive 215, the magnetic disk drive 217, and the optical disk drive 219. A user may enter commands and information into the computer system 201 through an input device 223, such as a keyboard, a pointing device, a touch screen, a microphone, a joystick or any other suitable interface device. Of course, the computer system 201 may employ a variety of different input devices 223, as is known in the art. An output device 225, such as a monitor or other type of display device, is also included to convey information from the computer system 201 to the user. As will be appreciated by those of ordinary skill in the art, a variety of output devices 225, such as speakers and printers, may alternately or additionally be included in the computer system 201.

In order to access electronic mail accounts, the computer system 201 preferably is capable of operating in a networked environment using logical connections to one or more remote computers, such as the remote computer 227. The computer system 201 may be connectable to the remote computer 227 through a local area network (LAN) 229 or a wide area network (WAN), such as the Internet. When used in a networking environment, the computer system 201 may be connected to the network through an interface 228, such as a wireless transceiver, a modem, an Ethernet connection, or any other suitable interface. While the interface 228 is illustrated as an internal interface in FIG. 2, it may alternately be an external interface as is well known in the art. Of course, it will be appreciated that the network connections described above are exemplary, and other means of establishing a communications link with other computers may be used.

Use of the Presentation Service and the Real-Time Service

With various embodiments of the invention, the data retrieved from the data store 109 may be requested and received over a wide area network, such as the -Internet. This type of communication medium is relatively unpredictable, however, and the existing level of traffic over the network may affect the speed at which the real-time service 117 receives requested data. Further, a request for data from the user's remote communication device 119 will not typically specify the size of the requested data. For example, a user may employ the remote communication device 119 to request his or her most recent email message from the data store 109 without knowing the size of the message. Accordingly, when the presentation service 115 receives a request for data from the user's remote communication device 119, the presentation service 115 typically cannot ascertain when it will receive the requested data from the access client 103.

This uncertainty presents a problem in that the presentation service 115 cannot determine in advance how long to maintain the connection 123 to the user's remote communication device 119. Typically, the remote communication device 119 will maintain an idle connection for only a preset time period before severing the connection. Thus, in some situations, the time between when the presentation service 115 requests the data from the real-time service 117 and when the presentation service 115 receives the requested data in reply may be longer than the amount of time that the user's remote communication device 119 will wait for a reply from the presentation service 115 before severing the connection 123.

In addition, the communications network supporting the communication device also may implement timeout procedures that are configured separately and independently from either the remote communications device 119 or the gateway server 101. These procedures may be used by communications service providers to prevent idle connections from consuming network resources that might otherwise be allocated to active connections. Thus, the communications network itself may timeout and sever the connection 123 to the gateway server 101 before a reply from the presentation service 115 has been received.

Moreover, different types of remote communication devices 119 will have different waiting periods before severing an idle connection (that is, a connection where data is not being exchanged). More particularly, some types of remote communication devices 119 may employ a relatively sophisticated communication software application that will maintain an idle connection for several minutes. For example, if the remote communication device 119 is a laptop personal computer, it may use a version of the Microsoft Internet Explorer browser to communicate with the presentation service 115. This type of communication software application is typically configured to receive rich data with graphics and colors, and thus will wait a relatively long time for a reply from the presentation service 115 before "timing out" and severing the connection 123.

On the other hand, a less sophisticated remote communication device 119 may employ a communication software application intended to receive only very simple data and that will only briefly maintain an idle connection. For example, a wireless telephone may communicate with the presentation service 115 using a streamlined browser that receives only text data and is designed to be navigated with a keypad. This type of simply communication software application will typically wait only a relatively short period of time for a reply from the presentation service 115 before timing out and severing the connection 123.

To address this discrepancy between different types of remote communication devices 119 and their different supporting communications networks, the gateway server 101 according to various embodiments of the invention may employ both the presentation service 115 and the real-time service 117. More particularly, with various embodiments of the invention, the real-time service 117 maintains the connection 121, which may be a persistent connection, to the access client 103. The presentation service 115 then manages the connection 123 with various remote communication devices 119 through various communications networks. Thus, the presentation service 115 and the real-time service 117 cooperate together to provide asynchronous retrieval of data from the data store 109 to the user's remote communication device 119. That is, the timing of communications between the real-time service 117 and the data store 109 (through the access client 103) is independent of the timing of communications between the presentation service 115 and a user's remote communication device 119.

According to various embodiments of the invention, the connection 121, the connection 123, or both may be encrypted. For example, the connection 121, the connection 123, or both may be encrypted using the Secure Sockets Layer (SSL) protocol. The encryption may be on a connection-by-connection basis. Thus, the connection 121 may be encrypted using one set of encryption information shared between the access client 103 and the real-time service 117, while the connection 123 may be encrypted using another set of encryption information shared between the user's remote communication device 119 and the presentation service 115. Alternately, with various embodiments of the invention, the connections 121 and 123 may be commonly encrypted "end-to-end," using encryption information shared between the user's remove communication device 119 and the access client 103.

Asynchronous Retrieval of Data

Figure 3A:
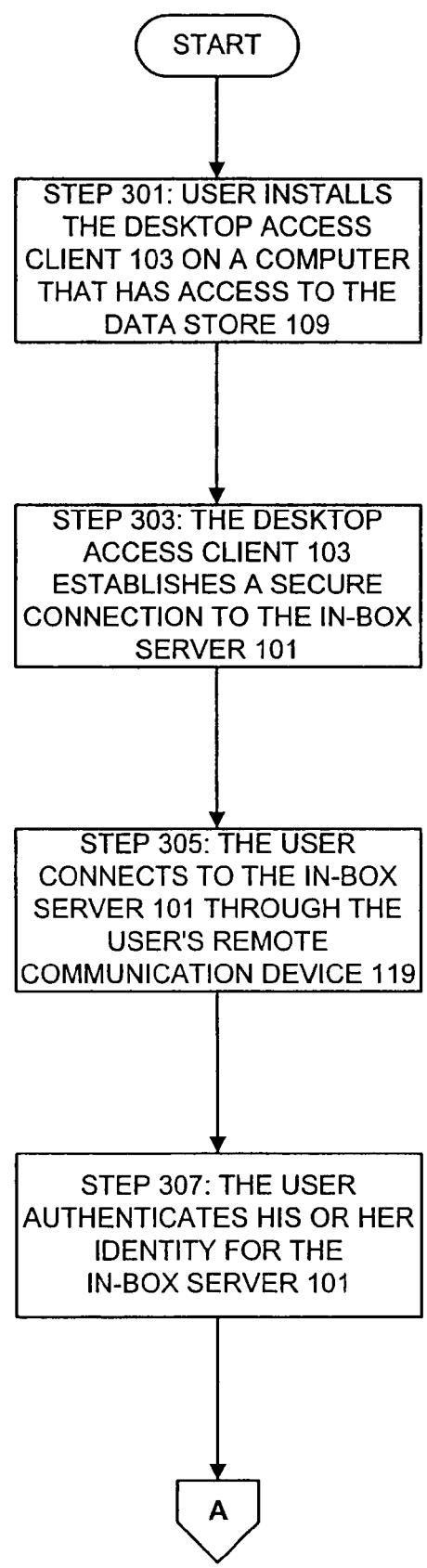
FIGS. 3A-3D illustrate a flowchart showing a method for asynchronously retrieving data according to various embodiments of the invention.
Figure 3B:
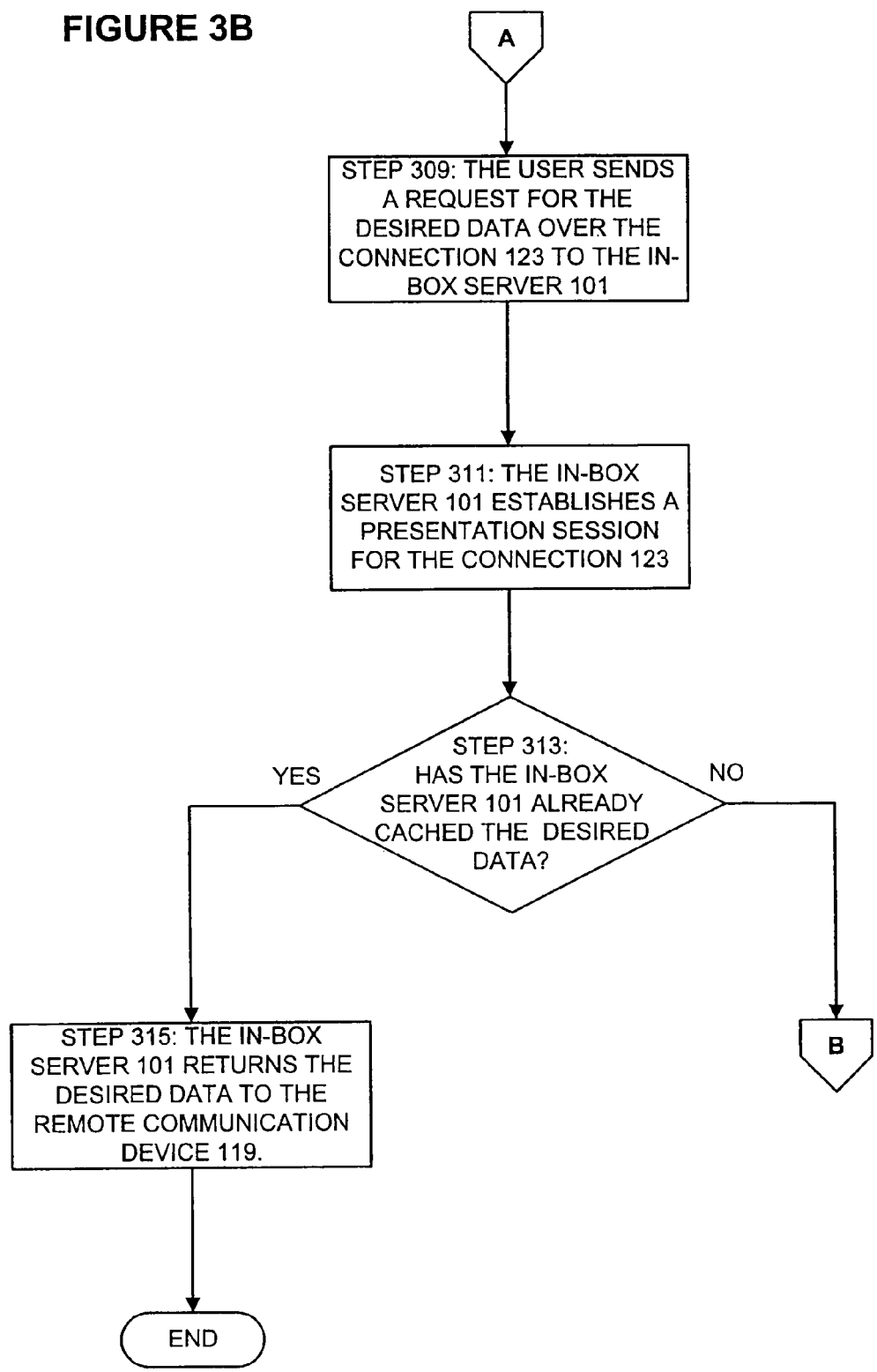
Figure 3C:
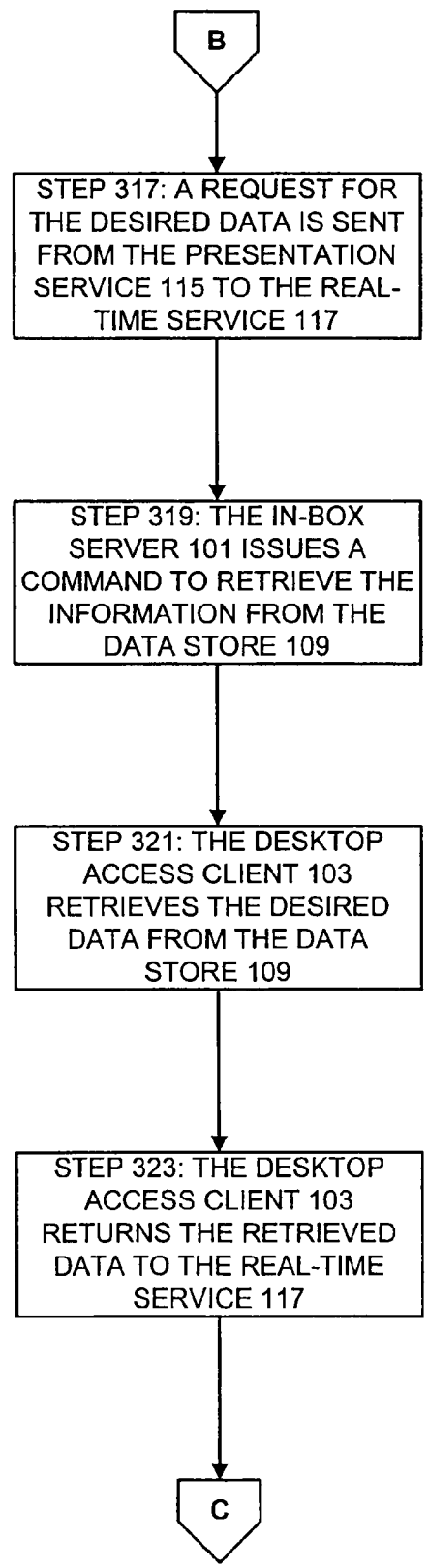
Figure 3D:
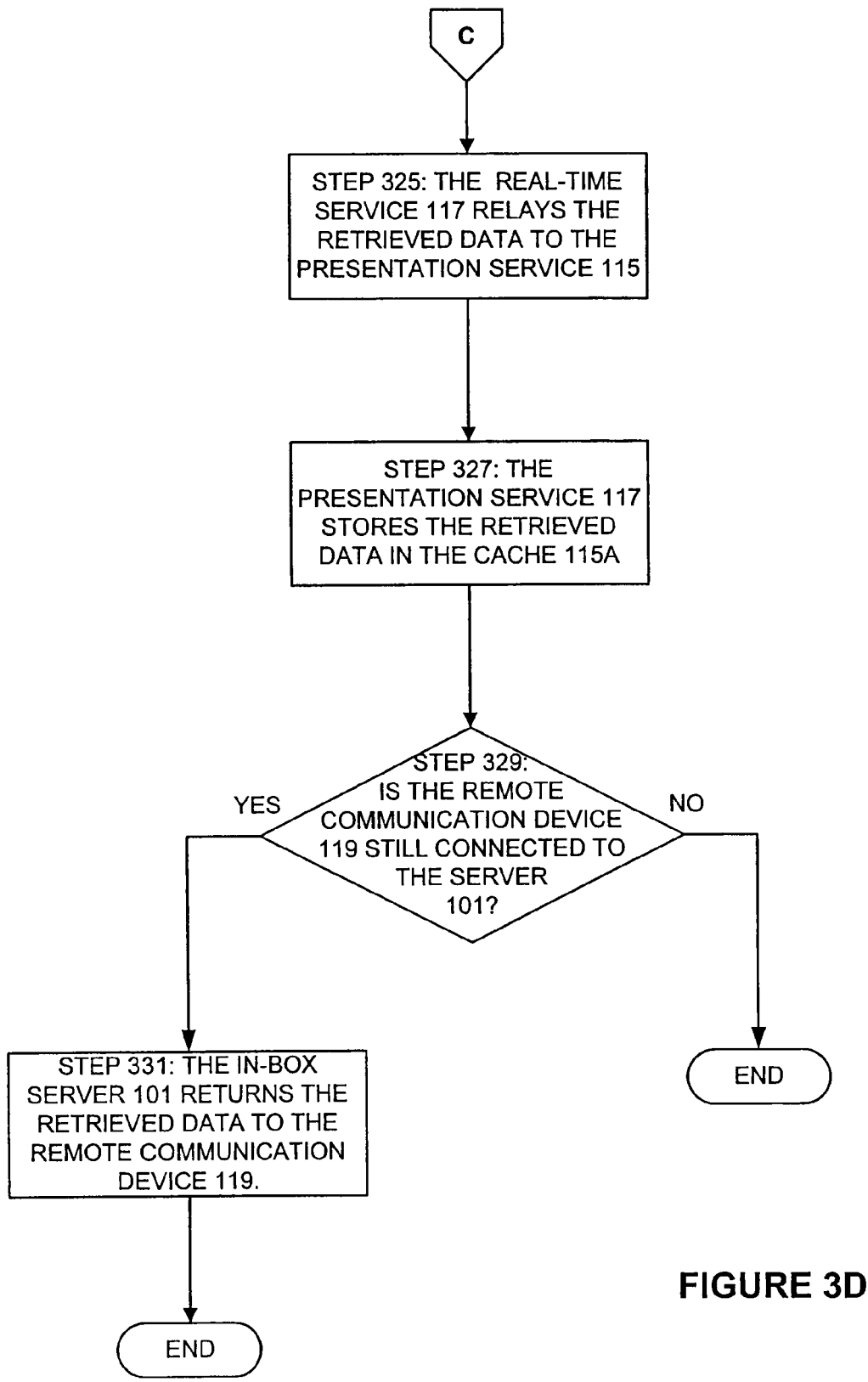
Figure 4A:
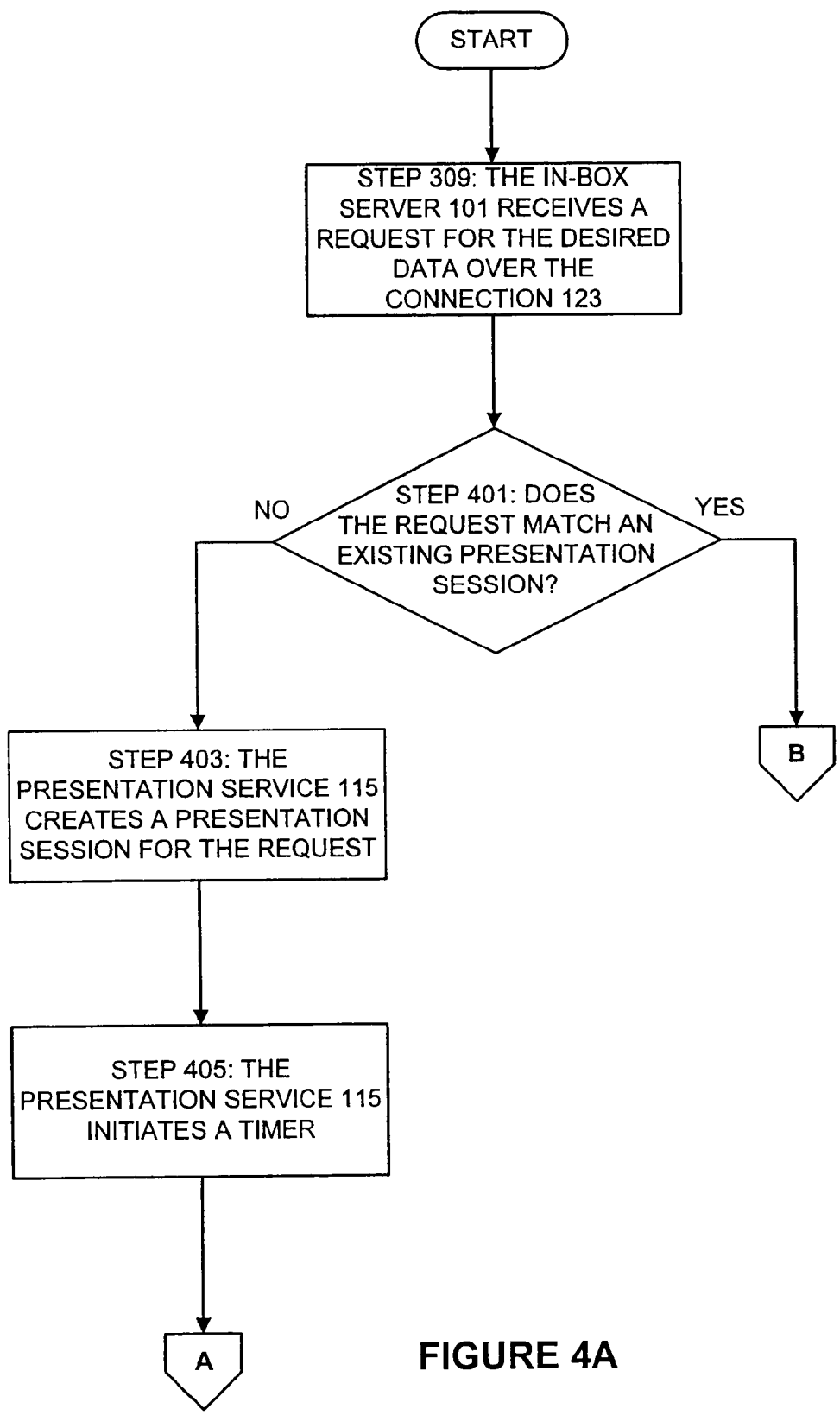
Figure 4B:
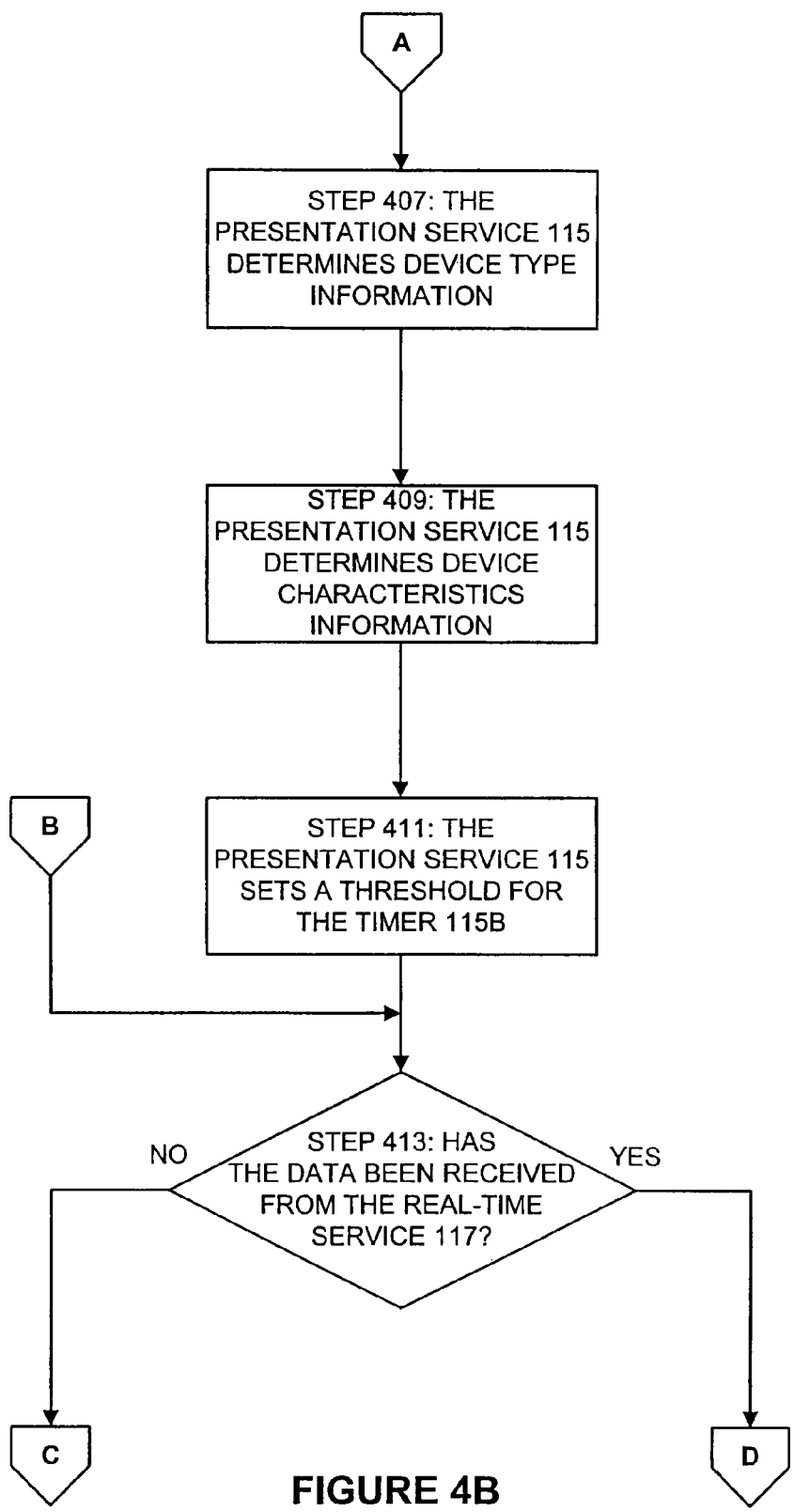
Figure 4C:
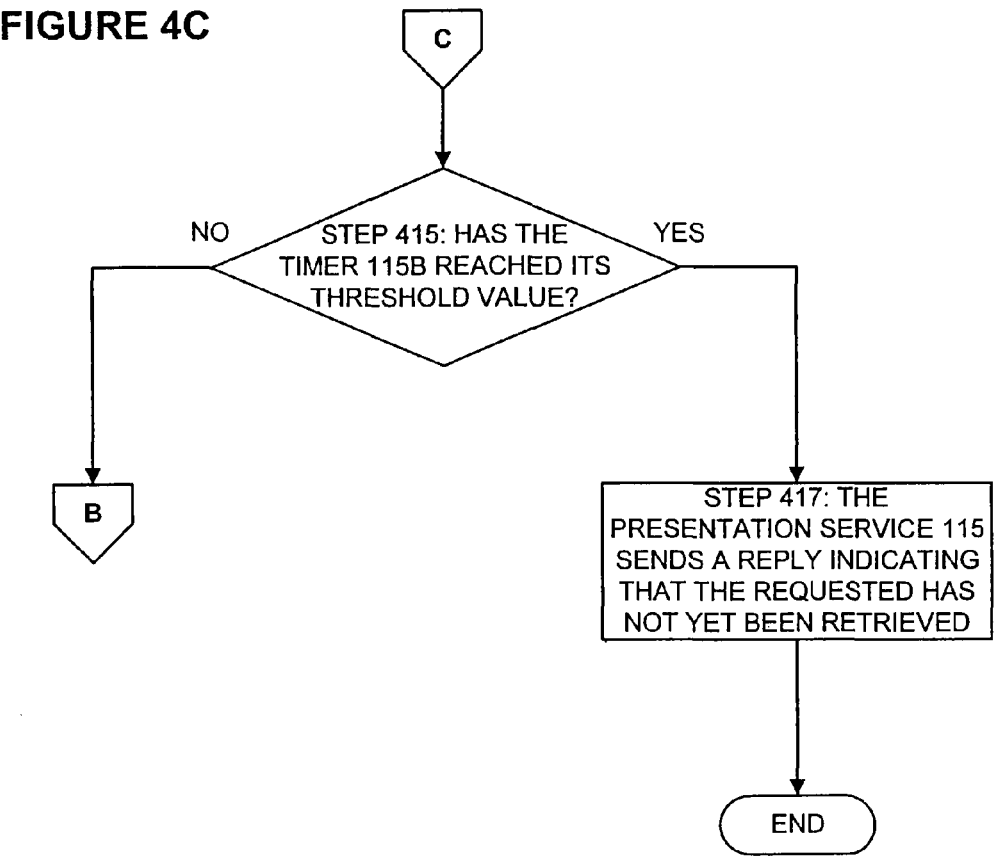
Figure 4E:
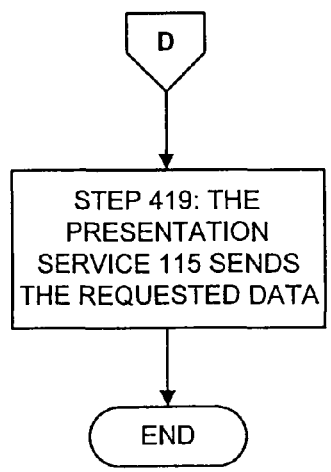

Referring now to FIGS. 3A-3D, these figures illustrate a flowchart for one process that may occur according to various embodiments of the invention when the user desires to send data to or retrieve data from the data store 109. As shown in FIG. 3A, in order to employ the system 100, a user first installs the access client 103 on a computer that has access to the data store 109 (that is, on the computer 105) in step 301. For example, if the data store 109 is a Microsoft Exchange server that manages the user's electronic mail messages, the user will install the access client 103 on a computer that has access to the user's electronic mail account on the data store 109. As part of the installation process for some embodiments of the invention, the user may submit authentication information. This authentication information then later can be used to authenticate the user's identity when the user attempts to retrieve data to or send data from the user's remote communication device 119.

In many situations, the user will employ the system 100 to send or receive electronic mail messages or other data from a data store 109 maintained by the user's employer. Accordingly, the data store 109 is illustrated in FIG. 1 as being within a corporate network environment 107, which may be behind the firewall 111, as previously noted. In these situations, the computer 105 may be the user's personal work computer that is also within the corporate network environment 107 and behind the firewall 111, and thus has easy access to the data store 109. It should be appreciated, however, that various embodiments of the invention may be employed to retrieve data from or send data to a data store 109 located within any computing environment. Also, any computing device having the desired access to the data store 109 may serve as the computer 105. Further, as will be explained in detail below, a user may employ multiple access clients 103 on different computers 105 to retrieve data from or send data to the data store 109, and multiple users may employ a shared access client 103 on a single computer 105 to retrieve data from or send data to the data store 109.

It should be appreciated that, while the access client 103 is described in the illustrated embodiment as a client hosted on a single computer 105, various alternate embodiments of the invention may employ any configuration for the access client 103. For example, the access client 103 may itself be implemented by a "server" computer that servers other computers in a network. Thus, the access client 103 may provide access to the data store 109 for more than one user. Further, the access client 103 may provide centralized management and administration tools that enable a system administrator (e.g., a system administrator for the data store 109) to manage and control utilization of the access client 109 by individual users by e.g., selecting them from a directory or company address list. Moreover, the access client 103 may thus be implemented on a server that performs other functions, which may or may not be related to the operation of the access client 103. For example, the access client 103 may be implemented on a public email server, such as a Yahoo or Hotmail email server, or on a private email server. Still further, with different embodiments of the invention, the operation of the access client 103 may be distributed among a plurality of computers 105.

Returning now to FIG. 3A, once the access client 103 has been installed on the computer 105 in step 301, the access client 103 establishes a secure communication connection to the gateway server 101 in step 303. More particularly, the access client 103 establishes a secure connection 121 with the real-time service 117 hosted by the gateway server 101. An entry for the connection, referred to as a real-time session, also is created in the directory 127. The directory 127 may be, for example, an Oracle database or other suitable database, or a Novell directory or other suitable directory. The entry for the connection 121 identifies both the user and the gateway server 101 hosting the real-time service 117 to which the connection 121 is made.

According to various embodiments of the invention, the connection 121 may be a persistent connection that is maintained as long as both the access client 103 and the real-time service 117 are operating to provide service to a user. With still other embodiments of the invention, however, the connection 121 may be established on an as-instructed or periodic basis. Thus, various embodiments of the invention may employ heuristics to determine when the access client 103 establishes the connection 121 with the real-time service 117. These heuristics may determine, for example, that the access client 103 will connect every minute (or some other time period) if it services a user (or users) who have not frequently retrieved data from the data store 109. These heuristics may also determine that the access client 103 will persistently maintain connection 121 if it services a user (or users) who have frequently retrieved data from the data store 109. Still further, various embodiments of the invention may employ these heuristics only under certain conditions, such as when network traffic for the network carrying the connection 121 increases above a threshold level, or when the real-time service 117 reaches some threshold of simultaneous connections 121 with multiple access clients 103.

In order to subsequently retrieve data from the data store 109 to the user's remote communication device 119 (or to send data from the user's remote communication device 119 to the data store 109), the user connects to the gateway server 101 through the user's remote communication device 119 in step 305. More particularly, the user establishes the communication connection 123 from the user's remote communication device 119 to the presentation service 115 hosted by the gateway server 101.

As will be appreciated by those of ordinary skill in the art, in addition to personally initiating a connection with the gateway server 101 and requesting data from the data store 109, one or more software applications running on the user's remote communication device 119 may also initiate the connection 123 to the presentation service 115 hosted by gateway server 101 on the user's behalf. Depending upon the purpose and needs of the particular software application, the software application can initiate the connection 123 on a periodic, scheduled, or event-driven basis and make one or more data requests asking to retrieve data from or sending data to the data store 109. This approach relieves the user of the need to pro-actively initiate all connections and data requests or transfers and greatly improves the overall user experience.

In the embodiment illustrated in FIG. 1, the user's remote communication device 119 is a wireless communication device that exchanges data or voice information over a wide-area wireless telephone communication network 125. For example, the user's remote communication device 119 may be a wireless telephone, or a personal digital assistant (PDA) or portable computer equipped with a wireless communication unit, such as a PCMCIA card like the Sierra Wireless AirCard.®. With still other embodiments of the invention, however, the user's remote communication device 119 may be connected to the gateway server 101 through any suitable connection, including a public communication network such as the Internet. For example, the user's remote communication device 119 may alternately be connected to the gateway server 101 using a wired connection, such as a conventional "dial-up" or DSL telephone connection, a high-speed broadband connection provided by a cable television service provider, or even an optical connection. Further, the user's remote communication device 119 may be connected to the gateway server 101 through another communication device, such as a public Internet kiosk. Thus, rather than connecting to the gateway server 101 over the wireless network 125, the user's remote communication device 119 may connect to the gateway server 101 over any suitable medium, including a wireless communication network, a wired communication network or a composite wired and wireless communication network.

Similarly, the connection 121 between the access client 103 and the real-time service 117 can be made over any suitable medium. In the illustrated embodiment, the connection 121 is established over a public, wide-area communication network, such as the Internet. With alternate embodiments of the invention, however, the connection 121 may be the established over, for example, a private communication network, such as a private wireless telephone communication network. Thus, the connection 121 also may be established over a wireless communication network, a wired communication network, or a composite wired/wireless communication network.

As will be appreciated by those of ordinary skill in the art, a variety of communication techniques and protocols have been developed for exchanging data between devices. For example, communications over both high and low bandwidth connections may be made using well-known extensible markup language protocols, such as the Hypertext Markup Language (HTML) protocol, the Extensible Markup Language (XML) or the Synchronization Markup Language (SyncML) or other messaging-centric protocols such as the Post Office Protocol (POP) or the Internet Message Access Protocol (IMAP). Similarly, communications over lower-bandwidth wireless connections (such as wireless telephone connections) may be made using the well-known Wireless Markup Language (WML) protocol. Any suitable protocol, including any of these known protocols, may be used to exchange data between the remote communication device 119 and the presentation service 115, and between the access client 103 and the real-time service 117. Thus, communications over the connection 121 between the access client 103 and the gateway server 101 may be made using HTML or XML pages, while communications over the connection 123 between the user's remote communication device 119 and the gateway server 101 may be made using HTML, XML, SyncML, or WML pages, or other protocols including, but not limited to, IMAP and POP3. Because the equipment and procedures for communicating data between devices using these protocols are well-known in the art, they will not be described in further detail here.

Returning now to FIG. 3A, the user authenticates his or her identity for the presentation service 115 in step 307. For example, the presentation service 115 may transmit one or more authentication inquiries to the user's remote communication device 119. These inquiries, which may be contained on a single markup language page, may ask the user for a username and password. In response, the user transmits the requested authentication information back to the presentation service 115. Of course, the user's remote communication device 119 may alternately or additionally provide one or more software applications for managing and presenting data, which includes user interface elements for collecting, storing, and submitting authentication information to the presentation service 115 without requiring the user to manually reenter the authentication information for each session with the presentation service 115.

When the user wishes to retrieve data from the data store 109, the user sends a request for the desired data over the connection 123 to the presentation service 115 in step 309. For example, the user may request the header information for the most recent 10 electronic mail messages in the user's electronic mail account on the data store 109. This request can be made using any suitable technique. For example, once the user's remote communication device 119 has established the connection 123 with the presentation service 115, the presentation service 115 may transmit WML pages with prompts to the user's remote communication device 119. These pages may, for example, contain a list of possible information that can be requested by the user. After the user selects the prompts corresponding to the desired information, the selected prompts are transmitted back to the presentation service 115 as a request for the desired data. Of course, still other techniques for retrieved desired information from the data store 109 may be employed, including techniques where data is retrieved automatically by an application on the remote communication device 119 without requiring the user's intervention, as previously noted.

In step 311, the presentation service 115 establishes a presentation session for the connection 123 with the user's .cndot. remote communication device 119. The presentation service 115 thus associates all subsequent communications related to the request for the desired data with the user's remote communication device 119. For example, the presentation session may be an entry in memory, such as a data table, associating the user's username and password with a presentation session value. The presentation session may also identify a location in memory, cache 1151, at which the desired data will be stored upon retrieval, and a flag indicating if the desired data as been stored to the cache 1151. The use of the presentation session to retrieve data from the data store 109 to the remote communication device 119 will be discussed in further detail below.

In step 313, the presentation service 115 checks to see if the desired information has already been cached in the cache 1151. As will be discussed in detail below, if the presentation service 115 determines that it already has cached the desired information then, in step 315, the presentation service 115 immediately retrieves the desired information from the cache 1151 and returns the desired information to the user's remote communication device 119. When the request for the desired data is initially made to the presentation service 115, however, the desired data probably will not have already been cached by the presentation service 115.

Accordingly, when the desired data is not currently in the cache 1151, a request for the desired data is sent from the presentation service 115 to the real-time service 117 in step 317. In response, the real-time service 117 issues a command over the connection 121 to the access client 103 in step 319, instructing the access client 103 to retrieve the desired information from the data store 109. Upon receiving the command from the real-time service 117, the access client 103 retrieves the desired data from the data store 109 in step 321. Then, in step 323, the access client 103 returns the retrieved data to the real-time service 117, which in turn provides the retrieved data to the presentation service 115 in step 325. The presentation service 115 then stores the retrieved data in the cache 1151 in step 327.

In step 329, the presentation service 115 determines if the request for the data is still pending from the user's remote communication device 119. That is, the presentation service 115 determines if the user's remote communication device 119 is still maintaining the connection 123 in wait for the desired data. If the request is still pending, then the retrieved data is provided to the user's remote communication device 119 in step 331.

Thus, if the desired data can be retrieved by the gateway server 101 from the data store 109 within the idle time of the user's remote communication device 119, then the desired data can be immediately provided to the user. In many situations, however, the gateway server 101 will not be able to retrieve the desired data before the idle time for the user's remote communication device 119 expires and the user's remote communication device 119 terminates the connection 123. As will be discussed in more detail below, the presentation service 115 addresses these situations by responding to the user's remote communication device 119 before its idle time expires.

More particularly, if the desired data is not retrieved before the user's remote communication device 119 terminates the connection 123, then the presentation service 115 will send a message to the user's remote communication device 119 instructing the user (or the user's remote communication device 119) to resubmit the request for the desired data. This response may be repeated until the desired data is retrieved from the data store 109 and stored in the cache 1151. By using the presentations session to associate these subsequent requests with the initial request for the desired data, the desired data can be transmitted to the user's remote communication device 119 once it has been stored in the cache 1151. That is, the desired data stored in the cache 1151 can be transmitted to the user's remote communication device 119 in response to an existing request for the data (i.e., over the existing connection 123) or when the request is resubmitted to the presentation service 115. Accordingly, desired data can be retrieved from the data store 109 on a real-time basis, regardless of the disparity between the idle time of the user's remote communication device 119 and the time required to obtain the desired data from the data store 109.

Communication with the Remote Communication Device

As previously noted, the presentation service 115 manages communications with the user's remote communication device 119, to ensure that the user's remote communication device 119 does not time out without receiving a reply to its request for data. FIGS. 4A-4E illustrate a flowchart showing one method that may be employed by the presentation service 115 according to various embodiments of the invention to reliably communicate with the user's remote communication device 119.

As previously noted, in step 309 of the flowchart shown in FIGS. 3A-3D, the user sends the presentation service 115 a request for desired data from the data store 109. In step 401, the presentation service 115 determines if the request is a new request for the desired data, or if it is a resubmission of an earlier request for the desired data. If the request is a new request for the desired data, the presentation service 115 creates a presentation session in step 403, and then passes the request along to the real-time service 117 to retrieve the desired data from the data store 109.

According to various embodiments of the invention, the process of creating the presentation session in step 403 includes designating the cache 1151 to be used for caching information relating to the request for the desired data from the user's remote communication device 119. As will be appreciated by those of ordinary skill, the presentation service 115 may employ any memory resource available to the gateway server 101. Because the requested data will be stored in the cache 1151 for immediate transmission to the user's remote communication device 119, however, a memory resource that can be quickly accessed to provide the requested data to the user's remote communication device 119 may conveniently be used for the cache 1151. With various embodiments of the invention, the cache 1151 may be encrypted or unencrypted.

The process of creating the presentation session in step 401 also includes designating identification information identifying the presentation session. This identification information is then provided to the real-time service 117 with the request for the desired information. When the real-time service 117 then returns the retrieved data retrieved from the data store 109, it also provides the corresponding presentation session identification information. Using this returned presentation session identification information, the presentation service 115 stores the retrieved data in the cache 1151 associated with the presentation session. It should be appreciated that any suitable identification information may be used to identify the presentation session for the data request. For example, the identification information may be a specific code or password. Alternately, with some embodiments of the invention, the identification information may be the memory address of the location of the cache 1151 for the presentation session.

In step 405, the presentation service 115 also initiates a timer 1153 for the user's remote communication device 119 corresponding to the presentation session. As will be discussed in more detail below, the timer 1153 will be used to predict when the user's remote communication device 119 will time out and sever the connection 123 to the presentation service 115. Further, in step 407, the presentation service 115 determines device type information for the device 119 that has requested the data. That is, the presentation service 115 determines information about the type of device making the request that will allow the presentation service 115 to identify operational characteristics for the user's remote communication device 119.

With some implementations of the invention, the presentation service 115 may determine only a general category into which the user's remote communication device 119 can be classified. For example, with some embodiments of the invention, the presentation service 115 may determine whether the user's remote communication device 119 is employing WML, HTML, SyncML, IMAP or POP or the like to communicate. If the user's remote communication device 119 is using HTML, the presentation service 115 then determines if the user's remote communication device 119 is a personal computer or a personal digital assistant (PDA). Thus, if the user is employing, for example, a Toshiba PocketPC.® PDA device to access the presentation service 115, the presentation service 115 may categorize that device as a personal digital assistant HTML device.

Still other embodiments of the invention, however, may determine different or more detailed information regarding the user's remote communication device 119. For example, with some embodiments of the invention, the presentation service 115 may determine the specific browser (or other communication software) being used by the user's remote communication device 119 to communicate with the presentation service 115, particular settings for that communication software, or any other information that might be useful to determine how the user's remote communication device 119 will communicate with the presentation service 115.

With some embodiments of the invention, this device type information may conventionally be provided by the user's remote communication device 119 when it initiates the connection 123. For example, if the user's remote communication device 119 sends a request for data using an HTML page, that page may conventionally include information that the presentation service 115 can use to determine the type of browser that the user's remote communication device 119 is employing to communicate with the presentation service 115. Alternate embodiments of the invention, however, may employ alternate techniques to provide the device type information to the presentation service 115.

For example, with some implementations of the invention, the user may specify the device type information for the user's remote communication device 119 when the user installs the access client 103 on the computer 105. Alternately or additionally, the user may specify the device type information using a survey or questionnaire page (such as a HTML page) provided to the access client 103 or to the user's remote communication device 119. Once the user has specified the device type information with the questionnaire page, the gateway server 101 may generate and place a cookie on the user's remote communication device 119. When the user then employs the user's remote communication device 119 to request data from the presentation service 115 thereafter, the presentation service 115 can solicit the device type information from the cookie on the user's remote communication device 119 in reply. Of course, still other techniques for determining the device type information will be apparent to those of ordinary skill in the art, and may be used with various embodiments of the invention.

Once the presentation service 115 has determined the device type information for the user's remote communication device 119 in step 407, the presentation service 115 employs that device type information to determine the communication characteristics of the user's remote communication device 119 in step 409. Among various communication characteristics that may be identified by the presentation service 115, the presentation service 115 determines how long the user's remote communication device 119 will wait for a reply to the request from the presentation service 115 before severing the connection 123. That is, the presentation service 115 uses the device type information for the user's remote communication device 119 to determine the idle time of the user's remote communication device 119.

For example, as previously noted, with the illustrated embodiment of the invention the presentation service 115 may determine if the user's remote communication device 119 is using WML or HTML to communicate and, if the user's remote communication device 119 is using HTML, whether the user's remote communication device 119 is a personal computer or a personal digital assistant. If the presentation service 115 determines that the user's remote communication device 119 is using WML to communicate, then the remote device 119 is probably a wireless telephone using a simple browser software application. Accordingly, the presentation service 115 may determine that the user's remote communication device 119 will only wait a small period of time (for example, 5 seconds) after submitting the request to receive a reply from the presentation service 115 before severing the connection 123. On the other hand, if the user's remote communication device 119 is a personal computer employing HTML to communicate, then the user's remote communication device 119 is probably using a sophisticated browser software application, such as Microsoft Internet Explorer. The presentation service 115 may therefore determine that the user's remote communication device 119 will wait for a relatively long period of time (for example, two minutes) to receive a reply from the presentation service 115 before severing the connection.

Various embodiments of the invention may employ different types of device type information to determine the device communication characteristics, as explained in detail above. Accordingly, different embodiments of the invention may also determine different types of device communication characteristics from the device type information. For example, if the presentation service 115 employs device type information that only identifies the user's remote communication device 119 as one of three broad categories of devices (e.g., a WML device, an HTML personal digital assistant device or an HTML personal computer device), then the presentation service 115 may correspondingly identify only one of three broad types of device communication characteristics. For example, it may determine that all WML devices will wait only 5 seconds for a reply, all HTML personal digital assistant devices will wait only 90 seconds for a reply, and that all HTML personal computer devices will wait only 2 minutes for a reply, regardless of the specific configuration of any particular device.

If, however, the presentation service 115 employs more detailed device type information, such as the particular browser being used by the remote communication device 119, then the presentation service 115 may correspondingly employ more specific device communication characteristics information. For example, the presentation service 115 may determine that a device 119 using the Microsoft Internet Explorer, Version 6.0. will wait only three minutes for a reply from the presentation service 115 before severing the connection 123, while a device using a Sony-Ericsson browser for wireless GSM telephones will wait only 45 seconds for a reply from the presentation service 115 before severing the connection 123. As will be apparent to those of ordinary skill in the art, the level of detail of the device characteristics information may depend upon the level of detail of the device type information obtained by the presentation service 115.

With various embodiments of the invention, the presentation service 115 may obtain the device characteristics information from, for example, a look-up table such as the device characteristics table 1155. The table 1155 may be populated using any conventional technique. For example, the device characteristics in the table 1155 may be populated when the server is initialized. Alternately, the gateway server 101 may populate the table 1155 by seeking the appropriate device characteristics information from a remote source, such as, for example, the Internet, for each new type of remote communication device 119 that is employed by a user.

In the illustrated embodiment, the table 1155 is a component of the presentation service 115, in order to allow the presentation service 115 to more quickly retrieve the device characteristics information. Alternate embodiments of the invention, however, may have the table 1155 located in the real-time service 117, an independent database directly or indirectly accessible by the presentation service 115, or even in the access client 103. Still other embodiments of the invention may employ other techniques to determine the device characteristics information. For example, if the user's remote communication device 119 provides a cookie to the presentation service 115 with the device type information, as discussed above, this cookie may also include the device characteristics information for the device 119. Further, with various embodiments of the invention, the use of the device information to determine the device characteristics information may be omitted entirely. Instead, for example, with these embodiments of the invention the user's remote communication device 119 may provide the appropriate device characteristics information directly to the presentation service 115 when making a request for data.

It should also be appreciated that, in addition to the idle time for the user's remote communication device 119, the device characteristics information may include other data as desired. For example, the device characteristics information may identify a particular data format employed by the user's remote communication device 119, a transmission speed for transmitting the retrieved data to the user's remote communication device 119, or other useful information corresponding to the device type of the user's remote communication device 119.

Returning now to FIG. 4B, when the presentation service 115 has determined the device characteristics for the user's remote communication device 119, the presentation service 115 sets a threshold for the timer 1153 in step 411 using the determined device characteristic information for the user's remote communication device 119. More particularly, the presentation service 115 sets a value for the timer 1153 at which the presentation service 115 will generate and send a reply to the request for data from the user's remote communication device 119. The threshold value is selected to allow the presentation service 115 time to reply to the user's remote communication device's request for data before the user's remote communication device 119 times out and severs the connection 123.

As will be appreciated by those of ordinary skill in the art, the specific threshold set for a timer 115 can be predicated upon a variety of factors, including the amount of time necessary to prepare and send a suitable reply. Thus, if a device 119 is using a sophisticated browser that requires a complex reply (including, for example, graphics), then the threshold may be set to allow more time for a reply than when the user's remote communication device 119 is using a simple browser that requires only a text reply.

For example, if the presentation service 115 has determined that the user's remote communication device 119 is using a simple browser and will wait only 5 seconds for a reply before severing the connection 123, then the presentation service 115 may set the threshold for the timer 1153 to be 3 seconds, allowing 2 seconds to generate and send the reply message. If, however, the presentation service 115 has determined that the user's remote communication device 119 is using a sophisticated browser and will wait two minutes for a reply before severing the connection 123, then the presentation service 115 may set the threshold for the timer 1153 to be 1 minute, 50 seconds, thereby allowing more time (i.e., 10 seconds) to prepare and send a more complex reply before the user's remote communication device 119 times out and severs the connection 123.

With various embodiments of the invention, still other factors can be taken into account when determining the threshold value for the time 1153, including, for example, current traffic conditions for the network 125 and the degree of reliability desired for the connection 123. Alternately, a single threshold value can be designated for each category of device type. Thus, for example, all communication devices 119 using WML may have a first threshold value for the timer 1153, all communication devices 119 that are HTML-using personal digital assistant devices can have a second threshold value for the timer 1153, and all communication devices 119 that are HTML-using personal computers can have a third threshold value for the timer 1153.

Of course, with still other embodiments of the invention, a single time period can be used to determine the timer threshold value for all types of communication devices 119, regardless of their individual device communication characteristics. For example, the timer threshold value can be set for all types of devices so that the presentation service 115 employs only a single time period for all types of devices. With these embodiments of the invention, the determination of both the device type information and the corresponding device characteristics information may be omitted.

It should also be noted that, while steps 401-411 have been described above as being in a specific order, other embodiments of the invention may order these steps in any desired manner. For example, some embodiments of the invention may set the threshold value and initiate the timer 1153 before relaying the request for data to the real-time service 117. Alternately, some embodiments of the invention may relay the request for data to the real-time service 117 before determining the threshold value and initiating the timer 1153. Still further, with some embodiments of the invention, the presentation service 115 may set the threshold value for the timer 1153 before initiating the timer 1153, while, with still other embodiments of the invention, the timer 1153 can be started before the threshold value for the timer 1153 is determined. Moreover, for example, with some embodiments of the invention, the presentation service 115 may designate the cache 1151 after the request for data has been relayed to the real-time service 117, before the request for data has been relayed to the real-time service 117, before the timer 1153 has been set, or after the timer 1153 has been set.

In any case, once the threshold value for the timer 1153 has been set and the request for data relayed to the real-time service 117, the presentation service 115 then monitors the real-time service 117 in step 413 for a reply containing the retrieved data and the identification information identifying the presentation session corresponding to the request for the retrieved data. If a reply is not received, then in step 415 the presentation service 115 determines if the timer 1153 has reached its threshold value. If the timer 1153 has not reached its threshold value, then the presentation service 115 continues to monitors the real-time service 117 for a reply with the requested data. If, however, the timer 1153 has reached its threshold value, then the presentation service 115 sends a reply to the user's remote communication device 119 in step 417, indicating that the desired data has not yet been retrieved from the data store 109.

More particularly, when the presentation service 115 determines that the threshold value has been reached, it formulates and sends a reply to the user's remote communication device 119 indicating that the desired data has not yet been retrieved. It should be appreciated that any suitable type of reply message may be employed by various embodiments of the invention. For example, with some embodiments of the invention, the reply message may be a page (such as an HTML or WML page) that displays a message to the user stating that the desired data has not yet been retrieved. With some embodiments of the invention, the reply message may additionally prompt the user to manually resubmit the request for the desired data. Thus, the reply message may display an invitation to the user to resubmit the request, along with a command prompt to resubmit the request. When the user activates the command prompt, associated software code in the reply page will instruct the user's remote communication device 119 to resubmit the request. Such automatic reply operations are well known, and thus will not be discussed in further detail. With still other embodiments of the invention, however, the reply message may simply include software instructing the user's remote communication device 119 to automatically resubmit the request of the desired data. With these embodiments of the invention, the reply message may thus omit displaying a message to the user.

For various embodiments of the invention, the reply message will also include presentation session identification data identifying the presentation session associated with the request. This presentation session identification information may be the same presentation session identification information provided to the real-time service 117, or it may be different from the presentation session identification information provided to the real-time service 117. Also, while the presentation session information provided to the user's remote communication device 119 may conveniently be transmitted with the reply message, it may also be transmitted in a separate communication. For example, the presentation session identification may be provided to the user's remote communication device 119 immediately after the user's remote communication device 119 has submitted an initial request for desired information.

In any case, when the user's remote communication device 119 resubmits the request for the desired information, the resubmitted request includes the presentation session information associated with the initial request for the desired data. Thus, when the resubmitted request is received by the presentation service 115, the presentation service 115 determines that the request matches an existing presentation session in step 401. The presentation service 115 then proceeds immediately to step 413 to determine if the desired data has been retrieved from the data store 109 and stored in the cache 1151.

If the desired data has been retrieved and cached in cache 1151, then the desired data is immediately returned to the user's remote communication device 119, as noted above. If, however, the desired data has still not been cached in the cache 1151, then the process of steps 401 and 413-417 are repeated until the desired data is retrieved from the data store 109, stored in the cache 1151, and then provided to the user's remote communication device 119 in step 419.

It should be noted that, with the illustrated embodiment, the presentation service 115 translates the retrieved data into a format that can be processed by the user's remote communication device 119 before transmitting the retrieved data to the user's remote communication device 119. It should also be appreciated, however, that this translation can be made at any point. For example, with some embodiments of the invention, the retrieved data can be translated into an appropriate format before it is stored in the cache 1151, while with other embodiments of the invention the retrieved data may be translated into an appropriate format just before it is transmitted to the user's remote communication device 119. With still other embodiments of the invention, however, the requested data may alternately or additionally be translated by the access client 103, the real-time service 117, the data store 109 or even the user's remote communication device 119 itself. Still further, the translation may even be performed by a combination of these components (including the presentation service 115).

The request for data may thus be submitted and resubmitted by the user's remote communication device 119 until the desired data is retrieved from the data store 109 by the real-time service 117 and stored in the cache 1151. If there is an error in retrieving the desired data, then the real-time service 117 may generate an error message informing the user's remote communication device 119 that the data cannot be retrieved. With some embodiments of the invention, this error message may be stored in the cache 1151 instead of the desired data. When the user's remote communication device 119 then retrieves data from the cache 1151, it will retrieve the error message informing the user that the desired data could not be successfully retrieved from the data store 109. Still other embodiments of the invention, however, may relay the error message immediately after receiving the error message from the real-time service 117.

With some embodiments of the invention, the presentation service 115, the real-time service 117, or both may "prefetch" data from the data store 109. Thus, various embodiments of the invention may employ heuristics to predict how much data a user will request from the data store 109 base upon, e.g., the user's previous pattern of data retrieval. For example, some users will frequently retrieve new email messages from their email account. For such a user, the presentation service 115 (or the real-time service 117) may independently periodically request all new email messages for the user from the data store 109. Accordingly, when the user employs the remote communication device 119 to retrieve his or her new email messages, that data will already be stored in the cache 1151. Still other users, however, may only occasionally request new email messages. For these users, the presentation service 115 (or the real-time service 117) may not independently request new email messages from the data store 109.

Similarly, some users will regularly request particular combinations of data. For example, some users will typically request retrieval of an email message, and then immediately request retrieval of any attachments to retrieved email messages. With these users, the presentation service 115 (or the real-time service 117) may independently request attachment data with any requests to retrieve new email messages for the user from the data store 109. Accordingly, when such a user then follows a request to retrieve a new email message with a request to retrieve attachment data for the retrieved email message, that attachment data will already be stored in the cache 1151.

Of course, various embodiments of the invention may employ further heuristics instead of or in addition to heuristics relating to retrieval frequency or the type of data retrieved. Such heuristics may include, for example, the level of service subscribed to by a user, the size of the data typically retrieved, or any other desired heuristics evaluation. Also, in addition to storing independently retrieved data in the cache 1151, various embodiments of the invention may also go ahead and forward the independently retrieved data to the remote communication device 119 without receiving an express request to retrieve that data.

Communication with the Access Client

As previously noted, the real-time service 117 retrieves the desired data from the data store 109 through the access client 103. More particularly, when the real-time service 117 receives a request for data from the presentation service 115, it relays that request to the access client 103. Because the access client 103 is hosted on the computer 105 that has access to the data store 109, the access client 103 can instruct the computer 105 to retrieve the desired data from the data store 109. When the computer 105 has obtained the desired data from the data store 109, the access client 103 returns the desired data to the real-time service 117.

With some embodiments of the invention, the real-time service 117 may communicate with the access client 103 using conventional communication techniques available to the computer 105, to thereby establish the connection 121. In some situations, however, the computer 105 will be located in an environment shielded from unauthorized access by a barrier, such as the firewall 111 illustrated in FIG. 1. In these situations, the barrier may prevent many types of conventional two-way communication between the computer 105 (and thus the access client 103) and the real-time service 117. With these embodiments of the invention, the real-time service 117 and the access client 103 may communicate using any suitable communication technique, such as the use of a virtual private network (VPN). In some situations, however, even if the barrier can be configured to allow for conventional two-way communication between the computer 105 and the real-time service 117, the process of reconfiguring the barrier may be onerous, particularly if a large number of users are employing different computers 105 to retrieve data from a remote communication device.

Accordingly, with various embodiments of the invention the real-time service 117 may employ a connection to the access client 103 through the network 113 that will pass through the firewall. As will be appreciated by those of ordinary skill in the art, various firewall systems will typically allow one or more specific access points by which a computer, such as the computer 105, may receive data from sources outside of the firewall. For example, conventional firewalls typically designate a port (sometimes identified as Port 80) through which a computer may receive data from outside sources. The real-time service 117 according to various embodiments of the invention may thus use such an access port to employ a one-way communication connection with the access client 103 through this type of designated port.

Using this one-way communication connection, hereafter referred to as the command channel, the real-time service 117 may send instructions to the access client 103. More particularly, the real-time service 117 may send instructions commanding the access client 103 to retrieve and relay information, such as the desired information, back to the real-time service 117. It also should be noted that the real-time service 117 may use the one-way command channel to instruct the access client 103 to retrieve information from a location other than the data source 109 as well. For example, a user may wish to add information, such as a new electronic mail message, to the data store 109 for storage or action. Upon receiving the new data from the user's remote communication device 119, the presentation service 115 (through the real-time service 117) may then instruct the access client 103 to retrieve the new data from the real-time service 117 for delivery to the data store 109.

Thus, with various embodiments of the invention, the command channel may be used only to send commands from the gateway server 101 to the access client 103. Because a command typically will be an instruction to take some action (e.g., retrieve headers for the first ten messages in the electronic mail folder "inbox" of the user, retrieve today's appointments from the electronic calendar for the user, perform a search for the text "Mike" in the electronic mail folder "contacts" of the user, etc.), the commands will usually be relatively small (e.g., less than 1 kB). As a result of their small size, multiple commands can be multiplexed on the command channel.

In turn, the access client 103 can send data associated with the command to the real-time service 117 (or retrieve data associated with the command from the real-time service 117) over one or more alternate connections, collectively referred to hereafter as data channels. For example, the commands may include a specific address to which the associated data should be posted (or from which the associated data should be retrieved). The command may also include a parameter that can subsequently be used by the access client 103 to identify that its response (either posting or retrieving data) is a reply to that specific command. Using this information, the access client 103 may then post data to the specified address (or retrieve data from the specified address) through a different socket from the socket used by the command channel. Similarly, the access client 103 may also post various commands to the real-time service 117. These commands may, for example, relate to the authorization of additional users for the access client 103.

Thus, a reply to a command from the real-time service 117 will not interfere with the access client's receipt of new commands from the real-time service 117, or with the transmission of data associated with responses to earlier commands. Advantageously, this arrangement improves the performance by allowing data channels to be established on as-needed basis directly to the physical server currently serving the user's device Together, the command channel and the data channels provide the connection 121 that allows two-way communication between the real-time service 117 and the access client 103 through a barrier such as a firewall.

For example, the real-time service 117 may command the access client 103 to retrieve the desired data from the data store 109, and then post the retrieved data, along with the presentation session identification information corresponding to the request, back to a specific address. The address may be a universal resource location (URL) address for a location maintained by the real-time service 117, thereby allowing the real-time service 117 to retrieve the desired data from the access client 103. The instructions (or a preceding or subsequent instruction) may also command the access client 103 to take some action with respect to the new data, such as storing the new data in the data store 109 or sending the new data to another location.

As previously noted, when the access client 103 establishes the persistent connection 121 with the real-time service 117, the real-time service 117 creates a real-time session for that connection. The real-time session may be, for example, a data object containing any desired data about the user and the connection, such as the port of the computer 105 through which the connection 121 is established. With some embodiments of the invention, the real-time session may be stored in the directory 127. Alternately, the real-time session may be stored in another suitable memory location.

For various embodiments of the invention, a proxy service may be employed between the access client 103 and the real-time service 117 (e.g., in the public wide area network 113). With this type of arrangement, the proxy service may close the connection 121 on its own accord after a predetermined amount of time without an exchange of data over the connection. Alternately or addition, other problems could occur relating to the proxy service, causing it to sever the connection 121. It would therefore be beneficial for the access client 103 to be able to detect when the connection 121 is severed, so that it can reestablish the connection 121. Conventional application programming interfaces for network communications, however, such as conventional application programming interfaces for communicating using TCP/IP, are typically not convenient for providing an application feedback when a network connection suddenly closes. Moreover, the real-time service 117 will not necessarily know that the connection 121 has been severed until, for example, it tries to write to the socket through which the connection 121 was established.

Accordingly, with various examples of the invention, the real-time service 117 may regularly send "heartbeat" messages to the access client 103. These heartbeats may be, for example, small groups of data packets that can be sent to continually maintain the one-way connection between the real-time service 117 and the access client 103. By periodically trying to send these heartbeats, the real-time service 117 can immediately detect when the connection 121 has been severed. Thus, by maintaining a continuous connection between the real-time service 117 and the access client 103, the real-time service 117 will be prepared to immediately process requests for desired data from the user's remote communication device 119 without having to initiate a new command channel for each new request.

With some embodiments of the invention, the heartbeat may include data indicating to the access client 103 when the next heartbeat from the real-time service 117 should be received. If the access client 103 then does not receive the next heartbeat within the indicated time period (and any additional buffer period, as desired), then the access client 103 can conclude that the connection 121 is severed and needs to be reestablished. Also, because the heartbeat is generated by the real-time service 117, the time value indicating the rate of the heartbeat can be controlled by the real-time service 117. More particularly, the rate data for the heartbeats can be adjusted by the real-time service 117 based upon, for example, the amount of traffic being handled by the gateway server 101. Thus, the heartbeat is dynamically schedulable.

For some implementations of the invention, the scheduled rate of the heartbeat may be the same for every connection 121. Alternate embodiments of the invention, however, may have two separate intervals for heartbeats. More particularly, some embodiments of the invention may have one heartbeat rate for active presentation sessions where a user is presently using a communication device 119 to communicate with the gateway server 101, and another heartbeat rate for inactive sessions. This arrangement can provide a quicker connection error detection time for sessions where a user will notice when the connection 121 is erroneously severed, and a less resource intensive connection error detection time where a user will not immediately notice when the connection 121 has been erroneously severed.

Multiple Use of the Access Client

While the use of the access client 103 was described above with reference to a single access client 103 accessing the data store 109, various embodiments of the invention may have multiple access clients 103 communicating with the gateway server 101. That is, each of a plurality of users can maintain an access client 103 communication with the gateway server 101. Moreover, a user can employ multiple access clients 103 to communicate with the gateway server 101.

Additionally, various embodiments of the invention may allow a single access client 103 to service more than one user. For example, with these embodiments, when a user installs the access client 103 on the computer 105, the access client 103 may inquire as to whether the user wants to delegate remote access to the user's data in the data store 109 through anyone else (i.e., another user employing a different access client 103). If the user would like the ability to access desired data in the data store 109 through another user's access client 103, then the access client 103 may facilitate that arrangement.

For example, if the access client 103 is being employed in a corporate network environment as illustrated in FIG. 1, the access client 103 may provide the user with a list of other persons having access to the corporate data store 109 (e.g., everyone in a corporate email server). When the user selects another person from the list, the access client 103 may, e.g., arrange for the selected person to receive an email reporting his or her selection (along with instructions on how to obtain and install an access client 103, if necessary). The user's access client 103 may also convey an encrypted message to the selected person, either by electronic mail or by another transmission technique. The encrypted message contains the information necessary to obtain the user's access to the data store 109. Thus, if the selected person agrees to provide access to the data store 109 for the user, the selected person's access client 103 can employ the access information contained in the encrypted message to obtain the user's access to the data store 109.

Advantageously, with some of the embodiments of the invention described above that employ a one-way command channel, the one-way command channel can service multiple users of the access client 103. More particularly, commands corresponding to different users may be multiplexed over the single command channel. With this arrangement, when the access client 103 establishes the connection 121 with the real-time service 117, it identifies the users that it is serving to the real-time service 117.

Use of Multiple Gateway Servers

Figure 5:
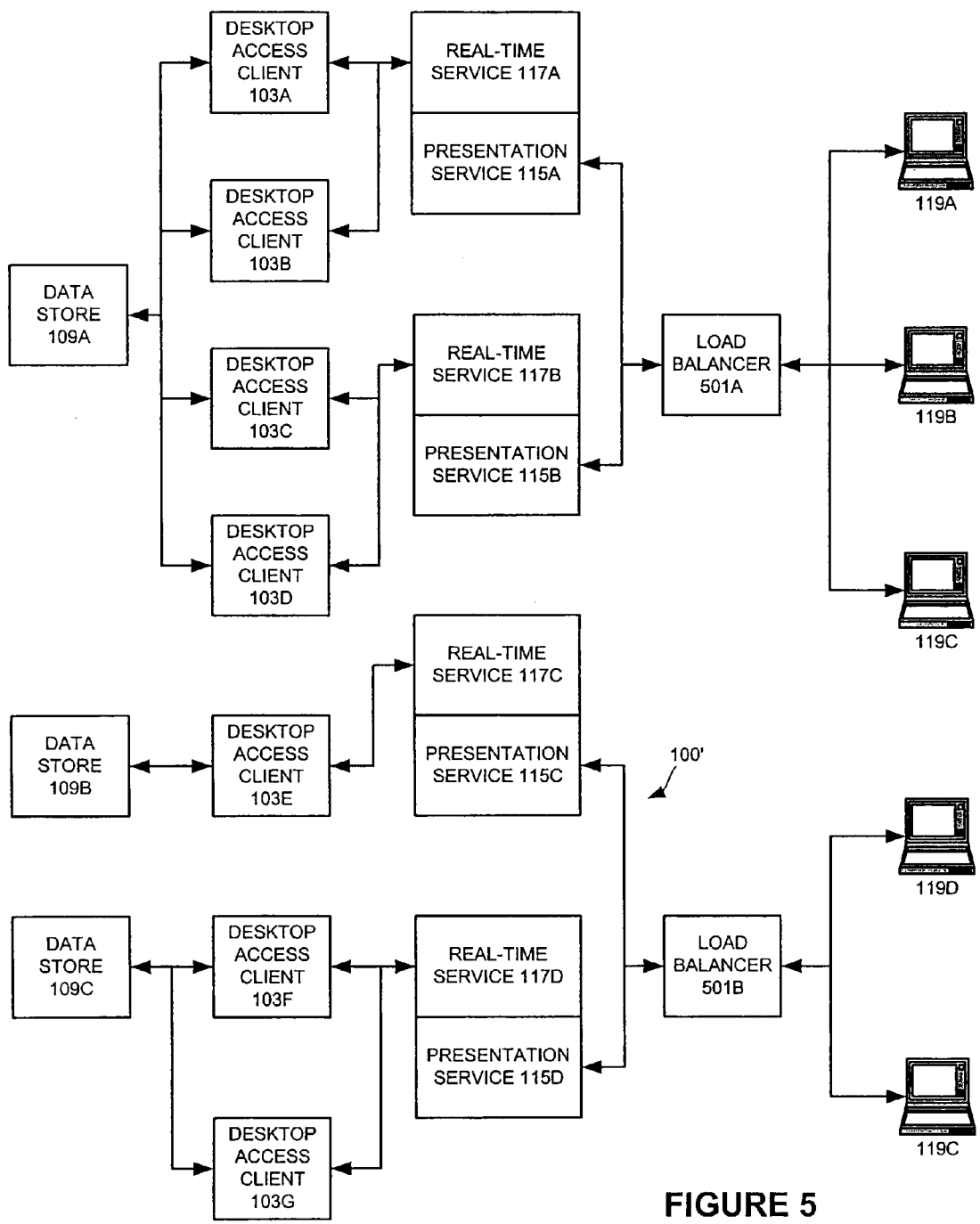
FIG. 5 illustrates a system for asynchronous retrieval of data employing multiple gateway servers according to various embodiments of the invention.

While the previous discussion described the user of only a single gateway server 101 for ease of understanding, many implementations of the invention would employ multiple gateway servers 101, as shown in FIG. 5, to both increase capacity and redundancy. For example, some embodiments of the invention may employ gateway servers 101 in an N+1 architecture, including as many gateway servers 101 as needed for a desired capacity, plus an extra gateway server 101 for redundancy.

A conventional N-tier Web service system may typically have between one and four tiers, depending upon the purpose of the service. For example, a conventional Web service system may include a first-tier Web server, a second-tier application server, and then a third-tier database server. In general, a user may access such a Web service system by presenting the Web server tier with a request, which then flows to the application server, and onto the database server in a vertical manner. This type of conventional network will often include one or more load balancers that route incoming requests based upon the current use of each server (i.e., the load balancer will route incoming requests to servers that are less occupied).

With various embodiments of the invention, however, each user has at least one access client 103 installed on a computer 105, which in turn establishes a persistent connection to a gateway server 101. Thus, when a user employs a remote communication device 119 to transmit a request to the data retrieval system 100', it would be more efficient to specifically route the request to the gateway server 101 that has already established a persistent connection 121 to the user's access client 103.

Advantageously, various implementations of the invention may conveniently match a user's incoming request to send or retrieve data with the user's access client 103. As noted above, when an access client 103 connects with a real-time service 117, the real-time service 117 creates a real-time session for that connection. While a real-time session exists for a persistent connection 121, it may exist across multiple requests from remote communication devices 119. That is, when a request from a remote communication device 119 is received by the presentation service 115, it can be mapped through a real-time session to the real-time service 117 maintaining the connection 121 to the user's access client 103. Moreover, each time that the request is subsequently received from the remote communication device 119, it can again be mapped back to the proper real-time service 117 through the real-time session. Thus, these embodiments of the invention provide a collocation process to collocate a user's presentation session, maintained by a presentation service 115, with the user's real-time session corresponding to the persistent connection established between the user's access client 103 and a real-time service 117.

Referring now to FIG. 5, with collocation, when an access client 103A is turned on, it negotiates a secure connection to a real-time service 117 provided by a gateway server (e.g., the real-time service 117A provided by gateway server 101A). In the process of establishing this connection, information pertaining to the connection is stored in the directory 127. For example, when a user USER1 employs the access client 103A, the real-time service 117 may note that USER1 has established a connection from the access client 103A to gateway server 101A (or to real-time service 117A). It should be noted that, with some embodiments of the invention, a user may delegate his or access to a data store (e.g., data store 109A in FIG. 5) to multiple access clients 103 as described above. If a user thereby is associated with connections to multiple real-time services 117, then suitable heuristics may be employed to select one connection to a gateway server 101 that is preferable to the others for the purpose of collocating a presentation session with a real-time session.

When a user subsequently employs a remote communication device 119 to, e.g., submit a request for data from the data store 109, the presentation service 115 receiving the request will initially authenticate the request, as discussed in detail above. For example, as previously noted, the presentation service 115 may provide the user's remote communication device 119 with an authentication user interface requesting the user's name, password, etc. Once the remote communication device 119 (i.e., the user) has been authenticated, the presentation service 115 makes a query to its associated real-time service 117, which in turn queries the directory 127 as to the gateway server 101 (or, alternately, the real-time service 117) corresponding to the user. More specifically, the real-time service 117 may query to the directory 127 whether the user has established an existing connection 121 between an access client 103 and a gateway server 101, and if such a connection 121 currently exists, which gateway server 101 is maintaining the connection 121.

If, for example, a request for data from USER1 is initially routed to gateway server 101B, by querying the directory 127 the gateway server 101B can determine that the user's access client 103 is currently connected to the gateway server 101A (i.e., to the real-time service 117A). Based upon this information, the presentation service 115B generates a redirect response for the remote communication device 119. The redirect response may be device specific, but may not require any special software. Instead, the response may be, for example, a conventional HTML, WML or HDML redirect command. The redirect response then causes the remote communication device 119 to issue its subsequent requests for the desired data specifically to the gateway server 101A. More particularly, the redirect response may, for example, provide the remote communication device 119 with software instructions, such an HTTP "cookie." These software instructions contain routing information (or, alternately, are themselves routing information) to be included in subsequent submissions of the request for the desired data.

Accordingly, when the remote communication device 119 resubmits a request for desired information, the routing information can be used to route the request directly to the presentation service 115 associated with the real-time service 117 maintaining a connection to the user's access client 103. For example, as shown in FIG. 5, a data retrieval system 100' according to various implementations of the invention may employ one or more load balancers 501. These load balancers

501 route both incoming data retrieval requests and incoming data submission requests from remote communication devices 119 to a gateway server 101. With these embodiments, when a load balancer receives a request, it first checks to determine if the request contains routing information, such as a cookie as described above. If the request does not contain routing information, then the load balancer 501 assigns the request to a gateway server 101 based upon the current load distribution of all of the gateway servers 101, as known in the art. If, however, the load balance 501 determines that a request does contain routing information, then it routes the request to the gateway server 101 identified in the routing information.

As will be appreciated by those of ordinary skill in the art, with this arrangement each load balancer 501 may have a public network address, such as a public Internet protocol (IP) address. The gateway servers 101 behind the load balancers 501 may then have virtual network addresses that cannot be directly accessed from outside of the network. For these implementations of the invention, the routing information will provide the virtual network address for the desired gateway server 101, and the load balancer 501 receiving a request containing the routing information can then map the request to the identified gateway server 101.

With various examples of the invention, the redirect response may also contain additional "handoff" information to be inserted into the subsequent requests for the desired data. When the routed gateway server 101 then receives a subsequent request for the desired, it can determine from the handoff information that the request is a handoff from another gateway server 101. The handoff information may also contain a time stamp, so that the routed gateway server 101 can confirm that the handoff was recent. Using this information, it will associate the request with a presentation session on the initial gateway server 101. The routed gateway server 101 can thus collocate the presentation session from the presentation service 115 of the initial gateway server 101 to its own presentation service 115, so that its own presentation service 115 returns the desired data to the remote communication device 119 when it is retrieved.

According to still other embodiments of the invention, the routed gateway server 101 may use the handoff information to employ the authentication performed by the initial gateway server 101, thereby avoiding requiring that the user reauthenticate himself or herself Accordingly, for these embodiments, the handoff information may be encrypted, to prevent unauthorized users from creating false handoff information to avoid authentication. Of course, the handoff information may be encrypted even if the routed gateway server 101 does not employ the authentication performed by the initial gateway server 101. Also, it should be noted that, with various embodiments of the invention, the collocation process can alternately be performed by the load balancers 501, but this may require customized code.

Thus, referring back to the above example for USER1, after a request for data from USER1 is initially routed to gateway server 101B, the gateway server 101B may determine from a query to the directory 127 that the user's access client 103 is currently connected to the gateway server 101A (i.e., to the real-time service 117A). Accordingly, the gateway server 101B provides a redirect response to the remote communication device 119A with handoff information. The handoff information will include routing information, such as, e.g., a virtual network address, for the gateway server 101A. The handoff information may also be encrypted, and may include a time stamp and, e.g., confirmation of USER1's authentication. When USER1 resubmits requests for the desired information, the new requests will include the handoff information. Accordingly, when the load balancer 501A receives the resubmitted requests, it will route the requests to the gateway server 101A for handling.

As will be appreciated by those of ordinary skill in the art, there may be some situations where this collocation process may not be employed. For example, a user may initially employ a first access client 103 to retrieve data. If that first access client 103 then fails before the data is retrieved, the user may be forced to employ a second delegated access client 103 to retrieve the information. In this scenario, it would not be desirable to reroute subsequent requests to another gateway server 101, as the gateway server 101 corresponding to the first access client 103 may already have some or all of the requested data in the cache 1151. Also, collocation may not be desirable when a user first signs up to the data retrieval system with the computer 105, but does not have an access client 103 installed yet.

It also should be appreciated that, with different embodiments of the invention, a separate locator service may perform one or more of the collocation functions instead of the presentation service 115. For example, with some embodiments of the invention, a locator service may query the directory 127 to determine the gateway server 101 to which the user's access client 103 is currently connected, and then generate a corresponding redirect response for the remote communication device 119.

Of course, various embodiments of the invention may alternately or additionally employ conventional remote call procedures to associate a presentation session maintained by a presentation service 115 on a gateway server 111 with a connection 121 maintained by a real-time service 117 on a different gateway server 101. Such remote call procedures may be employed, for example, instead of the collocation process described above, or if the collocation process fails for some reason.

Secure Communication Between the Access Client and the Real-Time Server

To establish a secure connection to a computer, a browser will typically use an encryption protocol, such as the Hypertext Transfer Protocol Secure, which employs the Secure Sockets Layer (SSL) encryption technique. With this protocol, encryption key certificates are preinstalled, and public key and private keys are used during a "handshake" process to negotiate a session key for the connection. With an SSL handshake, a third party cannot determine the session key, even if all of the exchanged data is intercepted. This type of protocol requires a great deal of resource overhead to begin, however, and requires a great deal of resource overhead to maintain. Moreover, with various examples of the invention, the presentation service 115 may be implemented using a conventional Web server, but the real-time service 117 may be implemented using a different type of server. With this arrangement, the real-time service 117 may use HTTP and/or HTTPS communications, but only to deliver messages through firewalls (e.g., for requests to Port 80, which conventionally are passed by firewalls).

Accordingly, it would be beneficial to allow the access client 103 and the real-time service 117 without maintaining an SSL session. Advantageously, various embodiments of the invention allow the access client 103 to communicate with the real-time service 117 without having to maintain an SSL session. According to these embodiments, the load balancers 501 also serve as encryption protocol terminators in addition to load balancers 501. That is, the load balancer may have SSL software or hardware (e.g., SSL accelerator cards) that handles SSL communications very quickly. When the load balancer passes a communication onto a gateway server 101, the communication thus is decrypted to a regular HTTP format (i.e., the load balancer 501 decrypts the communication before passing it to the gateway server 101). These specialized load balancers are known in the art and may be obtained from a variety of sources, and thus will not be discussed in further detail.

When the access client 103 attempts to establish a connection to the real-time service 117, it does not communicate directly with the real-time service 117. Instead, the access client 103 initially transmits an encrypted message, such as a HTTPS message, through a load balancer 501 to a presentation server 115. The HTTPS message is received at the load balancer 501, which decrypts the message and routes the message to a presentation service 115 as a HTTP message. More particularly, the load balancer 501 routes the request to the presentation service 115 of a gateway server 101 according to its balancing algorithm (e.g., to the gateway server 101 that is the least busy). The presentation service 115 then calls into the real-time service 117 to report that the access client 103 will soon be providing a request to establish a connection.

In response, the real-time service 117 creates an entry in a list of pending connections (e.g., a table of access clients 103 that will soon be connecting to the real-time service 117). In response, a unique session encryption key is generated (e.g., a 128-bit key), which is unrelated to the initial SSL communication between the access client 103 and the load balancer 501. Any desired encryption algorithm, such as RC4, may be used to generate the encryption key. The entry in the table will thus include the identity of the access client 103, a public session identification and a private encryption key.

The presentation service 115 then sends an HTTP reply that contains the address (such as a universal resource location (URL) address) corresponding to the real-time service 117 to which the access client 103 should connect. The reply also includes the public session identification and the private encryption key. The access client 103 can then transmit a message to the real-time service 117 using the address (e.g., using a URL of the form http://www.gateway.com/real-timeserver sessionID=xxxxxx). Using this arrangement, the message sent from the access client 103 to the real-time service 117 may be an unencrypted HTTP message, but the data in the message can be encrypted using the private encryption key. The real-time service 117 can then use the session identification in the message to locate the appropriate entry in the table with the corresponding private encryption key. The real-time service 117 will then decrypt the contents of the message with the private encryption key.

Thus, the access client 103 and the real-time service 117 can communicate without maintaining an encryption session. Instead, the access client 103 and the real-time service 117 can use the public session identification and the private encryption key to securely communicate. Moreover, by handing off the connection directly to the real-time service 117, these embodiments of the invention can avoid maximizing the limit of the load balancer 501. Of course, with still other embodiments of the invention, the access client 103 and the real-time service 117 can securely communicate while maintaining an encryption session (such as a SSL encryption session), but also have the data exchanged over the secure connection separately encrypted. That is, the data exchanged over the secure connection may use different encryption information, as described in detail above, than the encryption information used to maintain the secure connection.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. A gateway server, comprising:
a presentation service configured to a data request from a user's remote communication device, the data request requesting to receive data from a data store; and
a real-time service configured to relay the data request from the presentation service to an access client associated with the data store,
wherein the presentation service establishes a communication session for conveying data between a requesting remote communication device and the real-time service, and associates the communication session established for an initial data request of the requesting remote communication device with subsequent data requests from the same requesting remote communication device, and
wherein the gateway server
sets a timer, and, when the timer reaches the threshold time, determines whether data requested in the data request has been received after having been retrieved from the data store,
forwards the requested data to the requesting remote communication device when the requested data has been received, and
forwards a message to the requesting remote communication device to continue the communication session when the requested data has not been received.

2. A gateway server according to claim 1, wherein the gateway server is configured to transmit communication session identification data to the user's remote communication device before the requested data has been received by the presentation service.

3. A gateway server according to claim 2, wherein the presentation service is configured to associate a resubmitted data request with said initial data request using the communication session identification data transmitted to the user's remote communication device, whereby to forward the received data thereto.

4. A gateway server according to claim 1, wherein the presentation service utilizes device characteristics corresponding to the requesting remote communication device to determine said threshold time.

5. The gateway server according to claim 4, wherein the device characteristics correspond to a specific characteristic type for the requesting remote communication device.

6. The gateway server according to claim 4, wherein the device characteristics correspond to a generic characteristic type for the requesting remote communication device.

7. The gateway server according to claim 1, wherein the presentation service includes a cache configured to store the received data.

8. The gateway server according to claim 1, further comprising a directory for use in identifying a connection between one or more access clients and the real-time service.

9. The gateway server according to claim 1, wherein the data store includes a server device that provides services to one or more client devices and the real-time service is arranged to relay the data requests from the presentation service to an access client associated with the server device.

10. The gateway server according to claim 1, wherein the gateway server is arranged to select a data store from the group consisting of: a Microsoft Exchange server, a Lotus Domino server, an IMAP mail store, a POP3 mail store, and a NTFS file system.

11. The gateway server according to claim 1, wherein the presentation service is configured to receive the data requests from the remote communication device over a wireless network.

12. The gateway server according to claim 1, wherein a timing of communications between the real-time service and the access client is independent of a timing of communications between the presentation service and the remote communication device.

13. The gateway server according to claim 1, further comprising a directory storing an entry corresponding to the remote communication device and a corresponding connection between the real-time service and the access client, the entry identifying both the remote communication device and real-time service connected to the access client.

14. The gateway server according to claim 1, wherein the gateway server provides access to email data, calendar data and directory data.

15. The gateway server according to claim 1, wherein the data store resides behind a corporate firewall, and the real-time service is configured to relay the data requests from the presentation service to the database through the corporate firewall.

16. The gateway server according to claim 1, wherein the access client associated with the data stored resides behind a corporate firewall, and the real-time service is configured to relay the data requests from the presentation service to the access client through the corporate firewall.

17. The gateway server according to claim 1, wherein the access client associated with the data store is a public email server, and the real-time service is configured to relay the data requests from the presentation service to the public email server.

18. A method of retrieving data from a data store, comprising:
receiving a data request from a user's remote communication device at a presentation service, the data request requesting to receive data from a data store;
providing the received data requests to a real-time service;
relaying the data requests from the real-time service to an access client associated with the data store;
establishing a communication session corresponding to the data request for conveying data between a requesting remote communication device and the real-time service;
setting a timer in respect of the requesting remote communication device, and, when the timer reaches a threshold time, determining whether data requested in the data request has been received after having been retrieved from the data store;
forwarding the requested data to the requesting remote communication device when the requested data has been received;
forwarding a message to the requesting remote communication device to continue the communication session when the requested data has not been received; and
associating the communication session established for an initial data request of the requesting remote communication device with subsequent data requests from the same requesting remote communication device.

19. The method according to claim 18, wherein the message forwarded to the requesting remote communication device instructs the requesting remote communication device to resubmit the initial data request, the resubmitted initial data request becoming the subsequent data request.

20. The method according to claim 18, wherein the message causes the requesting remote communication device to automatically resubmit the initial data request.

21. The method according to claim 18, wherein the message prompts a user of the requesting remote communication device to resubmit the initial data request.

22. The method according to claim 18, comprising transmitting communication session identification data to the user's remote communication device before the data has been received by the real-time service.

23. The method according to claim 18, comprising utilizing device characteristics corresponding to the requesting remote communication device to determine the threshold time.

24. The method according to claim 23, wherein the device characteristics correspond to a specific characteristic type for the requesting remote communication device.

25. The method according to claim 23, wherein the device characteristics correspond to a generic characteristic type for the requesting remote communication device.

26. The method according to claim 18, further comprising relaying data retrieved from the data store by the access client in response to a data request and storing the retrieved data relayed from the real-time service in a cache provided by the presentation service before forwarding the retrieved data from the presentation service to the requesting remote communication device.

27. The method according to claim 18, further comprising receiving authentication information from the remote communication device at the presentation service.

28. The method according to claim 18, further comprising creating an entry in a directory corresponding to the remote communication device and a connection between the real-time service and the access client, the entry identifying both a user of the remote communication device and the real-time service connected to the access client.

29. The method according to claim 18, wherein the communication session is an entry in memory associating the remote communication device with a communication session value.

30. The method according to claim 18, wherein the communication session identifies a location in memory at which data retrieved from the data store in response to the data request will be stored.

31. The method according to claim 18, wherein the communication session identifies includes a flag indicating if data to be retrieved from the data store in response to the initial data request has been received and stored by the presentation service.

32. The method according to claim 18, wherein relaying the initial data request from the real-time service to an access client associated with the data store includes:
establishing a secure connection between the real-time service and the access client;
providing the access client with encryption information over the secure connection;
encrypting the initial data request with the encryption information; and
relaying the encrypted data request to the access client.

33. The method according to claim 32, wherein the secure connection is established using the Secure Sockets Layer protocol.

34. The method according to claim 32, wherein the secure connection is established through a load balancer configured to receive communications for the presentation service.

35. The method according to claim 32, wherein the encryption information includes a public encryption session identification and a private encryption key.

36. The method according to claim 32, further comprising receiving, at the real-time service, data retrieved from the data store by the access client in response to the initial data request.

37. The method according to claim 32, wherein receiving data retrieved from the data store by the access client in response to the initial data request includes:
receiving the retrieved data from the access client over an unsecure connection, wherein the retrieved data has been encrypted using the encryption information; and
decrypting the retrieved data using the encryption information.

38. A data retrieval system, comprising:
a data store;
an access client associated with the data store;
a remote communication device that issues a data request, the data request requesting to receive data from the data store;
a presentation service configured to receive the data request from the remote communication device; and
a real-time service configured to maintain a connection with the access client associated with the data store, and relay the data request to the access client via the connection,
wherein the presentation service is configured to establish a communication session for conveying data between a requesting remote communication device and the real-time service, and associate the communication session established for an initial data request of the requesting remote communication device with a subsequent data request from the same requesting remote communication device,
wherein the presentation service:
sets a timer, and, when the timer reaches a threshold time, determines whether data requested in the data request has been received after having been retrieved from the data store,
forwards the requested data to the requesting remote communication device when the requested data has been received, and
forwards a message to the requesting remote communication device to continue the communication session when the requested data has been received.

39. A data retrieval system according to claim 38, wherein the presentation service is configured to transmit communication session identification data to the user's remote communication device before the requested data has been received by the presentation service.

40. A data retrieval system according to claim 39, wherein the presentation service is configured to associate a resubmitted data request with said initial data request using the communication session identification data transmitted to the user's remote communication device, whereby to forward the received data thereto.

* * * * *